US012767032B2

(12) United States Patent
Farris et al.

(10) Patent No.: US 12,767,032 B2
(45) Date of Patent: Oct. 20, 2026

(54) JACK HITCH SYSTEM AND DEVICE

(71) Applicant: Dolly Hitch LLC, Sarasota, FL (US)

(72) Inventors: William J. Farris, Carbondale, CO (US); Erilson U. Silva, Sarasota, FL (US)

(73) Assignee: DOLLY HITCH LLC, Carbondale, CO (US)

( * ) Notice: Subject to any disclaimer, the term of this patent is extended or adjusted under 35 U.S.C. 154(b) by 336 days.

(21) Appl. No.: 18/435,916

(22) Filed: Feb. 7, 2024

(65) Prior Publication Data

US 2024/0300270 A1 Sep. 12, 2024

Related U.S. Application Data

(60) Provisional application No. 63/451,197, filed on Mar. 9, 2023.

(51) Int. Cl.
*B60D 1/46* (2006.01)
*B60P 1/44* (2006.01)

(52) U.S. Cl.
CPC ............ *B60D 1/465* (2013.01); *B60P 1/4421* (2013.01)

(58) Field of Classification Search
CPC ......... B60K 17/358; B66F 19/00; B66D 1/36; B66D 1/00
See application file for complete search history.

(56) References Cited

U.S. PATENT DOCUMENTS 3,652,106 A 3/1972 Waterman
4,704,062 A * 11/1987 Hale ..................... B60P 1/6454 414/500
5,286,050 A 2/1994 Stallings, Jr. et al.
5,570,754 A * 11/1996 Stimson ............... B60K 17/358 180/234
5,671,937 A 9/1997 Haberle
5,727,920 A 3/1998 Hull et al.
6,431,628 B1 * 8/2002 Bell, Jr. ................ B60P 3/0257 296/22
6,623,028 B1 9/2003 Johnston
6,685,211 B2 2/2004 Tles
6,802,441 B1 10/2004 DuRant et al.
7,040,645 B1 * 5/2006 Borneman ............. B60D 1/485 280/492

(Continued)

OTHER PUBLICATIONS

Medmartonline/EZ-Carrier-Automatic-lift-https/://medmartonline.com/ez-carrier-automatic-electric-carrier-lift-/ Aug. 23, 2020, 3pages, USA.

(Continued)

*Primary Examiner* — Jayanti K Patel
(74) *Attorney, Agent, or Firm* — Olav M. Underdal; IDP Patent Services

(57) ABSTRACT

A jack hitch system includes a jack hitch device, including an upper jack hitch assembly with an upper elongated body, left and right pivotable and extendable handlebars, an l-shaped member, a front wheel, a lifting assemblage with a interior lifting assembly, a rotatable handle and an electric engine, and a front mounting piece for connecting to a hitch mount of a vehicle, and a lower jack hitch assembly with a lower elongated body, left and right rear wheels, a rear mounting piece for mounting an accessory object. The system can include a jack hitch platform, including pivotable side panels, pivotable wheels, and a front mounting connector.

29 Claims, 18 Drawing Sheets

Jack Hitch System

(56) References Cited

U.S. PATENT DOCUMENTS

| | | | | |
|---|---|---|---|---|
| 7,143,914 | B2 | 12/2006 | McManus | |
| 7,284,620 | B1 | 10/2007 | Dover | |
| 7,591,478 | B2 | 9/2009 | Christopher | |
| 7,607,546 | B1 * | 10/2009 | Hopper | B66C 23/44 414/462 |
| 7,641,235 | B1 | 1/2010 | Anduss | |
| 7,845,670 | B2 | 12/2010 | Oberg | |
| 8,061,572 | B2 | 11/2011 | Myrex | |
| 8,235,642 | B2 | 8/2012 | Camaly | |
| 10,112,523 | B2 | 10/2018 | McConn et al. | |
| 10,124,822 | B2 | 11/2018 | Nielsen et al. | |
| 10,486,611 | B1 | 11/2019 | Klindt | |
| 10,843,717 | B2 | 11/2020 | Ingleson | |
| 2002/0180179 | A1 * | 12/2002 | Krauss | B60D 1/07 280/460.1 |
| 2004/0032112 | A1 | 2/2004 | Reese et al. | |
| 2004/0075239 | A1 * | 4/2004 | Call | B62D 47/025 280/511 |
| 2004/0207173 | A1 * | 10/2004 | Krauss | B60D 1/065 280/414.5 |
| 2005/0179241 | A1 * | 8/2005 | McManus | B60R 9/06 280/769 |
| 2006/0062657 | A1 | 3/2006 | Davis et al. | |
| 2006/0145461 | A1 | 7/2006 | Anderson | |
| 2006/0228201 | A1 * | 10/2006 | Lenceski | A63B 71/0045 414/466 |
| 2007/0164069 | A1 * | 7/2007 | Threet | B60R 9/065 224/527 |
| 2008/0073872 | A1 * | 3/2008 | Scott | B60D 1/66 280/490.1 |
| 2009/0020369 | A1 * | 1/2009 | Warachka | B66F 9/08 187/222 |
| 2010/0066069 | A1 | 3/2010 | Bradshaw | |
| 2010/0133783 | A1 * | 6/2010 | Walstrom | B60S 9/22 280/475 |
| 2017/0203699 | A1 * | 7/2017 | Williams | B60R 9/06 |
| 2022/0017020 | A1 * | 1/2022 | McFadden | B60R 9/06 |

OTHER PUBLICATIONS

Medmartonline/Scootalift, https://medmartonline.com/scootalift-universal-mobility-carrier, Sep. 13, 2020, 4pages, USA.

* cited by examiner

Jack Hitch System

Jack Hitch System

Jack Hitch Device

Platform Device

Method of Using a Jack Hitch System

JACK HITCH SYSTEM AND DEVICE

CROSS-REFERENCE TO RELATED APPLICATIONS

This application claims the benefit of U.S. Provisional Application No. 63/451,197, filed Mar. 9, 2023; which is hereby incorporated herein by reference in its entirety.

FIELD OF THE INVENTION

The present invention relates generally to the field of devices for mounting on a hitch mount of a vehicle, and more particularly to methods and systems for jack hitches with related accessories for mounting on a hitch mount of a vehicle.

BACKGROUND OF THE INVENTION

Hitch-mountable devices for mounting on a hitch mount of a vehicle are in common use, for example to enable transport of bicycles and other objects.

However, such hitch-mountable devices are often limited in their applicability, and will generally only support transport of a particular type of objects, such as for example bicycles. Further, the typically lack support for moving larger objects onto the hitch-mountable device, and do not have the necessary structural support for transport of large objects.

As such, considering the foregoing, it may be appreciated that there continues to be a need for novel and improved devices and methods for hitch-mountable devices.

SUMMARY OF THE INVENTION

The foregoing needs are met, to a great extent, by the present invention, wherein in aspects of this invention, enhancements are provided to the existing model of hitch-mountable devices.

In an aspect, a jack hitch system can include:

a) a jack hitch device, which can be configured to be connected to a hitch mount of a vehicle; and b) a jack hitch platform, which can be configured to be attached to the jack hitch device, wherein the jack hitch platform can be configured to receive a cargo object for transportation.

In a related aspect, the jack hitch device can include an upper jack hitch assembly, which comprises:

a) an upper elongated body;

b) a left handlebar, which is pivotably mounted to a left side of the upper elongated body, such that the left handlebar is configured to be positionable in a left stowed position along the upper elongated body, and such that the left handlebar is configured to be positionable in a left folded-out configuration, which is perpendicular to an elongated direction of the upper elongated body; and c) a right handlebar, which is pivotably mounted to a right side of the upper elongated body, such that the right handlebar is configured to be positionable in a right stowed position along the upper elongated body, and such that the right handlebar is configured to be positionable in a right folded-out configuration, which is perpendicular to an elongated direction of the upper elongated body.

In a further related aspect, the left handlebar can be configured to be length-adjustable and telescoping, and the right handlebar can be configured to be length-adjustable and telescoping.

In a yet further related aspect, the left handlebar can further include:

a) a left inner handle portion; and b) a left outer handle portion;

such that the left inner handle portion is hollow and configured to slidably receive the left outer handle portion, which is configured to slide into the left inner handle portion; and wherein the right handlebar further comprises:

c) a right inner handle portion; and d) a right outer handle portion;

such that the right inner handle portion is hollow and configured to slidably receive the right outer handle portion, which is configured to be slidable into the right inner handle portion.

In another further related aspect, the jack hitch device can further include a lower jack hitch assembly, which can include:

a) a lower elongated body, which can be configured with a rectangular cross-sectional shape, such that the lower elongated body is configured to be slidable into the upper elongated interior of the upper elongated body, such that the rectangular cross-sectional shape prevents rotation of the lower elongated body inside the upper elongated interior.

In another further related aspect, the jack hitch device can further include a lower jack hitch assembly, which can include:

a) a lower elongated body, which is configured to be slidable into the upper elongated interior of the upper elongated body; and b) left and right rear wheels, which are rotatably mounted to a lower end of the lower elongated body, on lower left and right sides of the lower elongated body, respectively.

In a further related aspect, the jack hitch device can further include:

a) a rear mounting piece, which is hollow and comprises a rear mounting interior, wherein the rear mounting piece is perpendicularly connected to a rear side of a lower end of the lower elongated body, such that the rear mounting piece is configured to connect to the jack hitch platform on a rear side of the jack hitch device.

In a further related aspect, the upper jack hitch assembly of the jack hitch device can further include:

a) an l-shaped member, which can include:

a horizontally protruding piece, such that an inner end of the horizontally protruding piece is connected to a front of a lower end of the upper elongated body; and a vertically protruding piece, such that an upper end of the vertically protruding piece is connected to an outer end of the horizontally protruding piece; and b) at least one front wheel, which is mounted on a lower end of the vertically protruding piece, such that the jack hitch device is configured to stand independently on the left and right rear wheels and the at least one front wheel, when the at least one front wheel is at level with the left and right rear wheels.

In another related aspect, the upper jack hitch assembly of the jack hitch device can further include:

a) a front mounting piece, wherein the front mounting piece can be perpendicularly connected to a front side of a lower end of the vertically protruding piece, such that the front mounting piece is configured to attach to the hitch mount of the vehicle.

In yet another related aspect, the upper jack hitch assembly of the jack hitch device can further include a lifting assemblage, which can include:

a) an interior lifting assembly, which is connected between the upper elongated body and the lower elongated body, such that the interior lifting mechanism is configured to vertically move the lower elongated body relative to the upper elongated body.

In a further related aspect, the lifting assemblage can further include:

a) a rotatable handle, which is connected to the interior lifting assembly, wherein the rotatable handle is configured such that:
   i. a first rotation of the rotatable handle in a first direction causes the interior lifting assembly to retract the lower elongated body relative to the upper elongated body; and
   ii. a second rotation of the rotatable handle in a second direction causes the interior lifting assembly to extend the lower elongated body relative to the upper elongated body.

In another further related aspect, the lifting assemblage can further include:

a) an electric motor, which includes a rotatable shaft, wherein the electric motor is connected to the upper elongated body and the rotatable shaft is connected to the interior lifting assembly, wherein the electric motor is configured such that:
   i. a first rotation of the rotatable shaft in a first direction causes the interior lifting assembly retract the lower elongated body relative to the upper elongated body; and
   ii. a second rotation of the rotatable shaft in a second direction causes the interior lifting assembly to extend the lower elongated body relative to the upper elongated body.

In a related aspect, the jack hitch platform can further include:

a) a platform surface; and
b) a right side pivotable panel, which can be configured to pivot to a closed position in an upright orientation and can be configured to pivot to a folded down configuration, with an outer end of the right side pivotable panel resting on an adjacent ground surface, such that the right side pivotable panel facilitates loading of the cargo object onto the platform surface.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
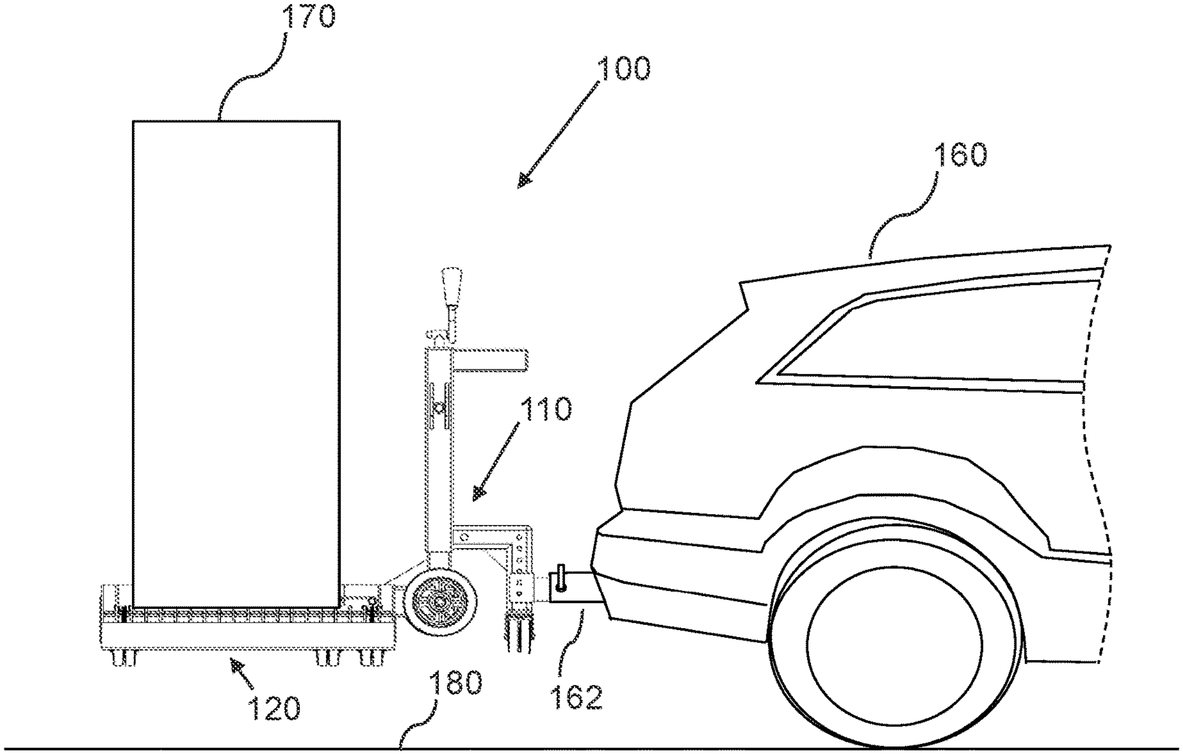
FIG. 1 is a right side view of a jack hitch system mounted on a hitch mount of a vehicle, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a jack hitch system 100 with reference to FIG. 1, in such manner that like reference numerals refer to like components throughout; a convention that we shall employ for the remainder of this specification.

In an embodiment, as shown in FIG. 1 and FIGS. 2A-2C, a jack hitch system 100 can include:

a) a jack hitch device 110, which is configured to be connected to a hitch mount 162 of a vehicle 160;
   wherein the jack hitch device 110 is configured to accept a detachable connection of a jack hitch accessory device, such as a jack hitch platform 120.

In related embodiments, the jack hitch accessory device can be configured to carry a special category of objects, such as bicycles or motorcycles.

In another related embodiment, the jack hitch system 100 can be configured as a system kit, which can include:

a) a jack hitch device 110, which is configured to be connected to a hitch mount 162 of a vehicle 160; and
b) a plurality of jack hitch accessory devices, wherein the jack hitch device 110 is configured to accept a detachable connection of each jack hitch accessory device in the plurality of jack hitch accessory devices, wherein each jack hitch accessory device is configured in the plurality of jack hitch accessory devices is configured to carry cargo objects of a particular type or category of types.

In a further related embodiment, the plurality of jack hitch accessory devices can include:

a) at least one jack hitch platform 120 (such as a small and a large jack hitch platform 120); and
b) a jack hitch accessory device configured to carry bicycles.

In a related embodiment, as shown in FIG. 1 and FIGS. 2A-2C, a jack hitch system 100 can include:

a) a jack hitch device 110, which is configured to be detachably connected to a hitch mount 162 of a vehicle 160; and
b) a jack hitch platform 120, which is configured to be attached to the jack hitch device 110, such that the jack hitch platform 120 is configured to receive a cargo object 170 for transportation, such as a tool box, trash can, cooler, refrigerator, suitcase, luggage, tool box, moving box, general box, or other type of object, such that the cargo object 170 is positioned on a surface of the jack hitch platform 120.

Figure 3A:
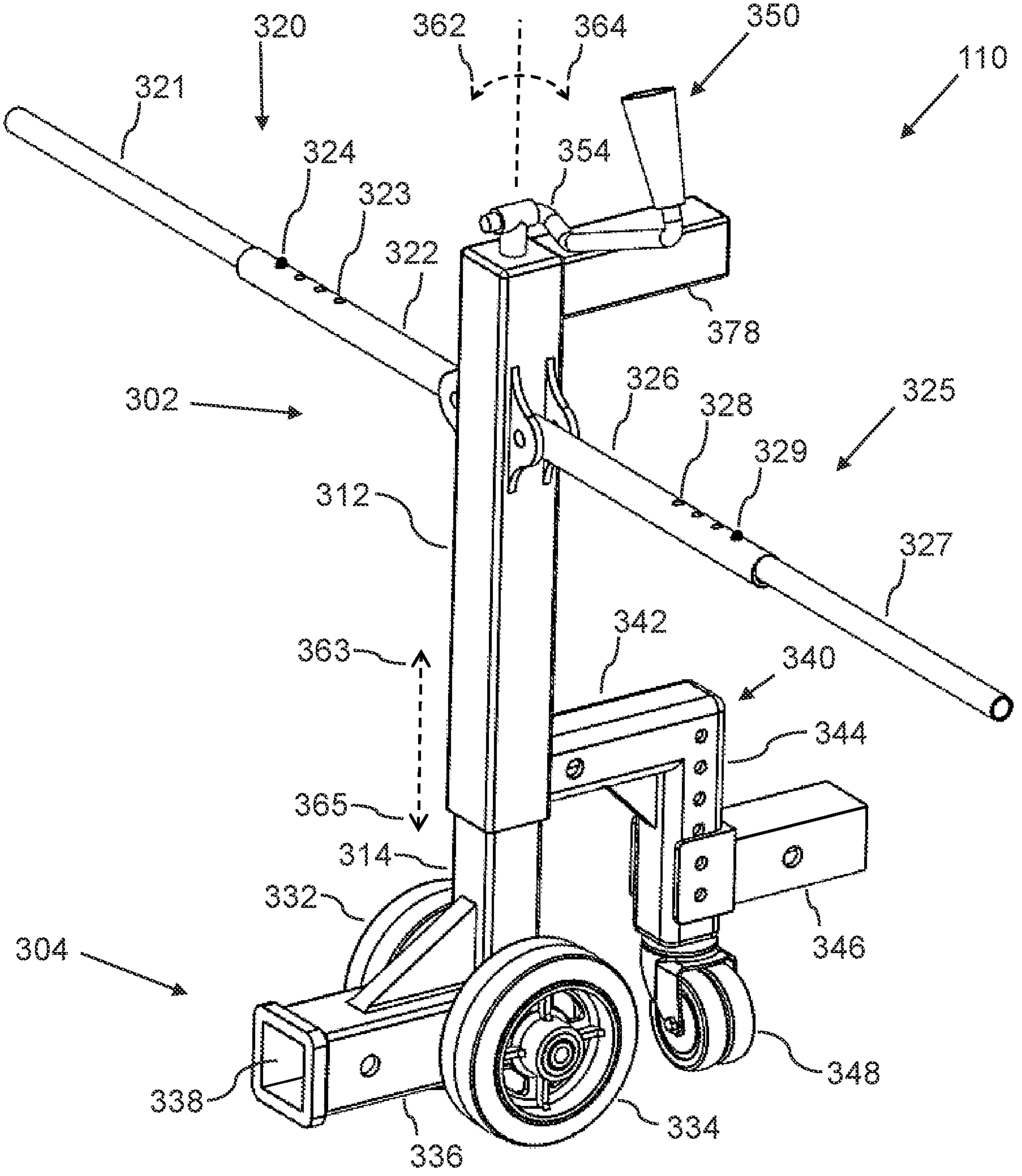
FIG. 3A is a rear top right perspective view of a jack hitch device, according to an embodiment of the invention.
Figure 3B:
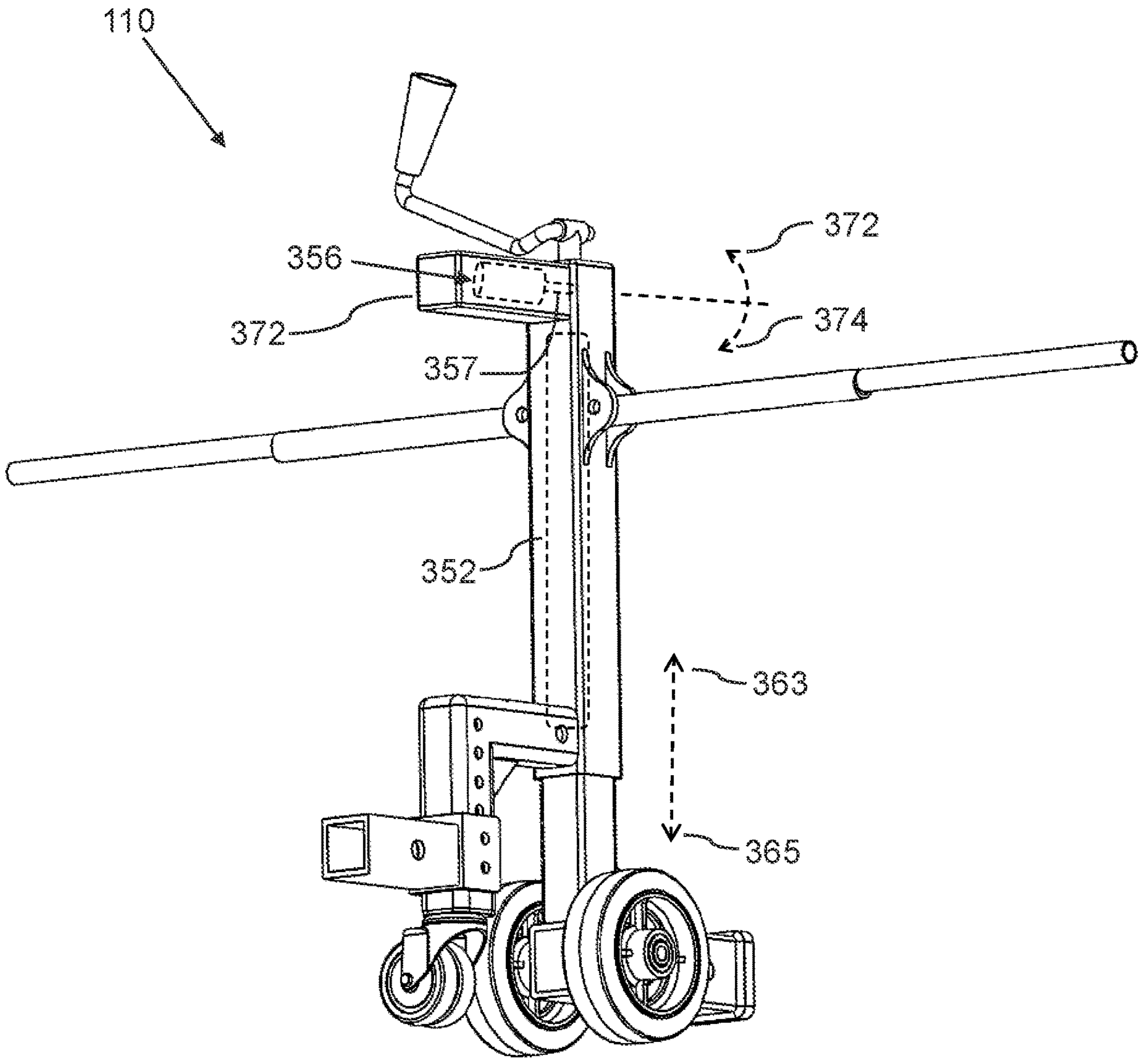
FIG. 3B is a front bottom left perspective view of a jack hitch device, according to an embodiment of the invention.
Figure 3C:
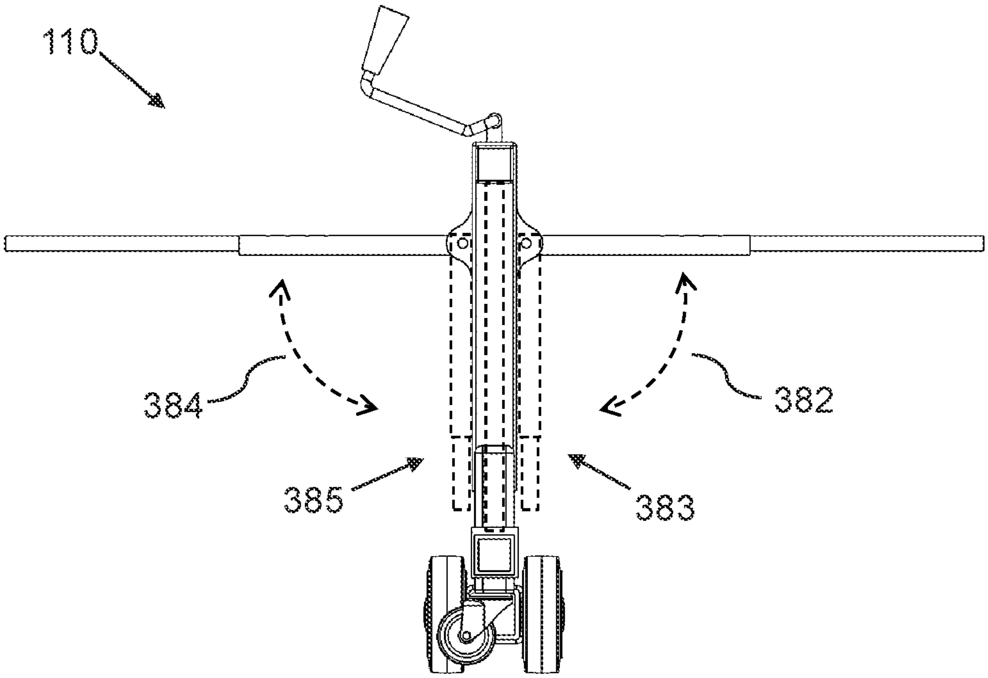
FIG. 3C is a front view of a jack hitch device, according to an embodiment of the invention.
Figure 3D:
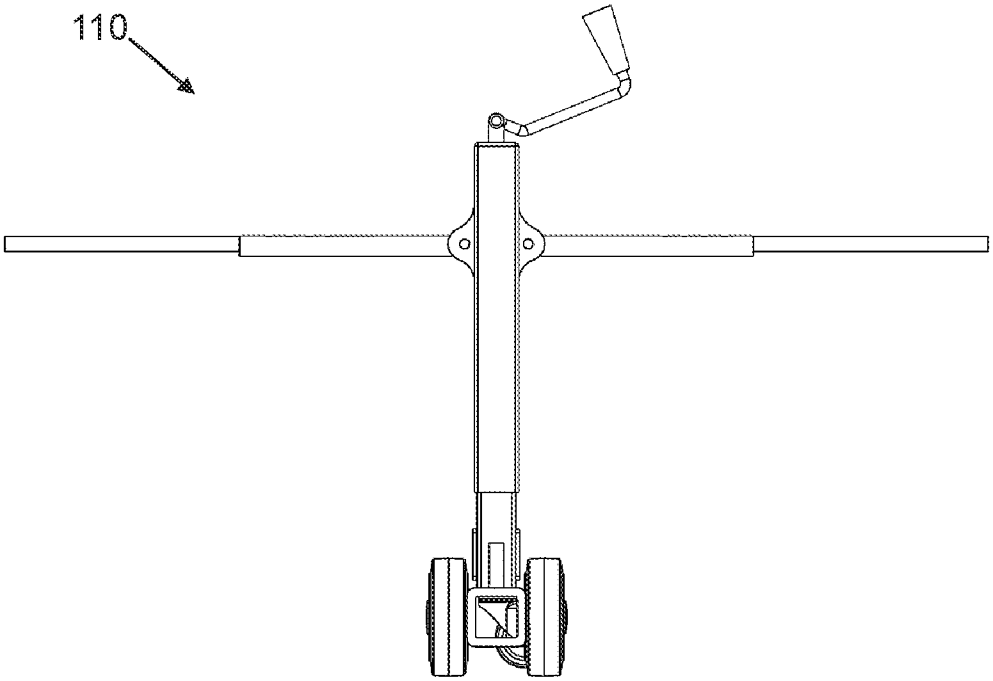
FIG. 3D is a rear view of a jack hitch device, according to an embodiment of the invention.
Figure 3E:
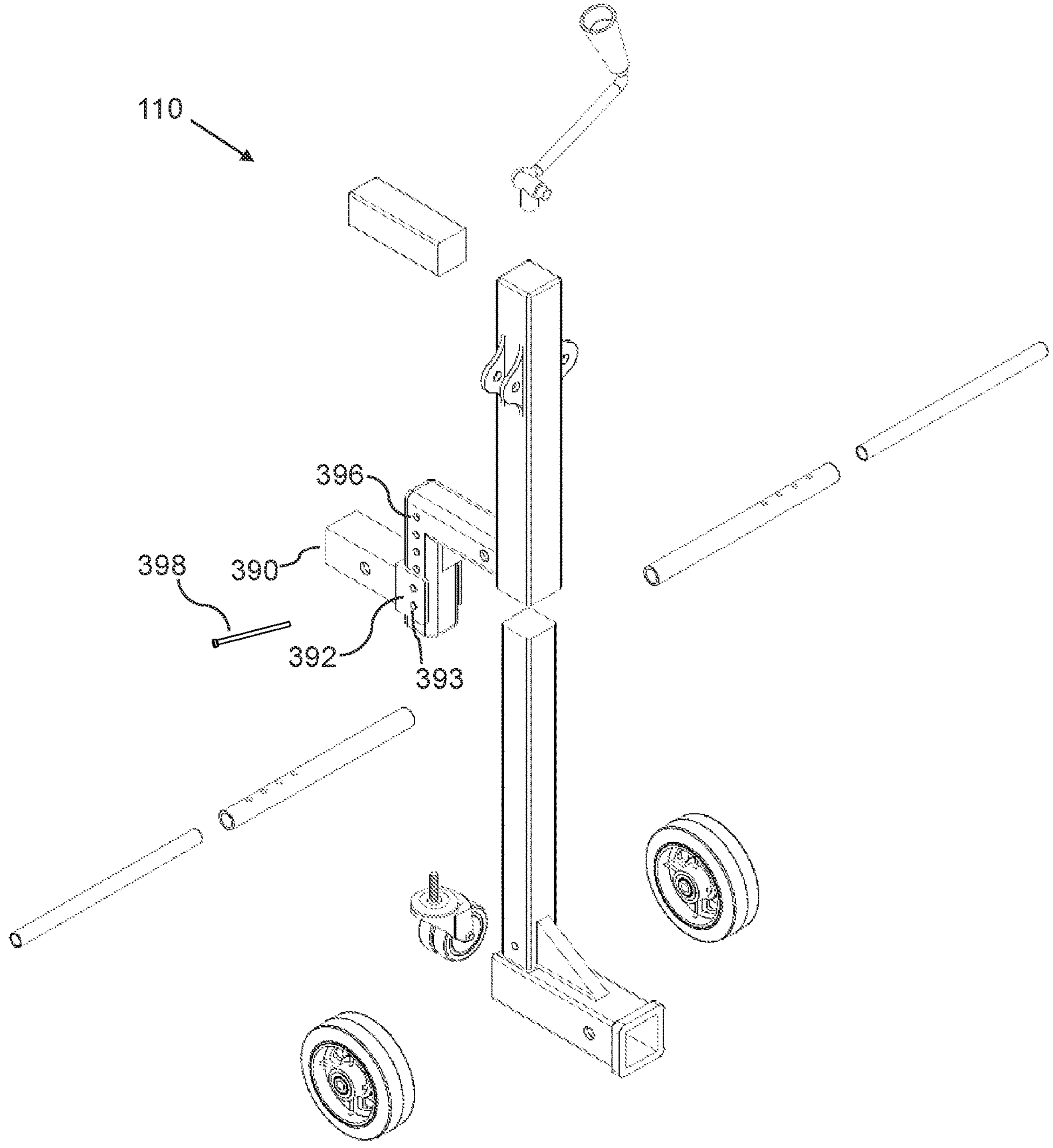
FIG. 3E is a top rear exploded perspective view of a jack hitch device, according to an embodiment of the invention.
Figure 3F:
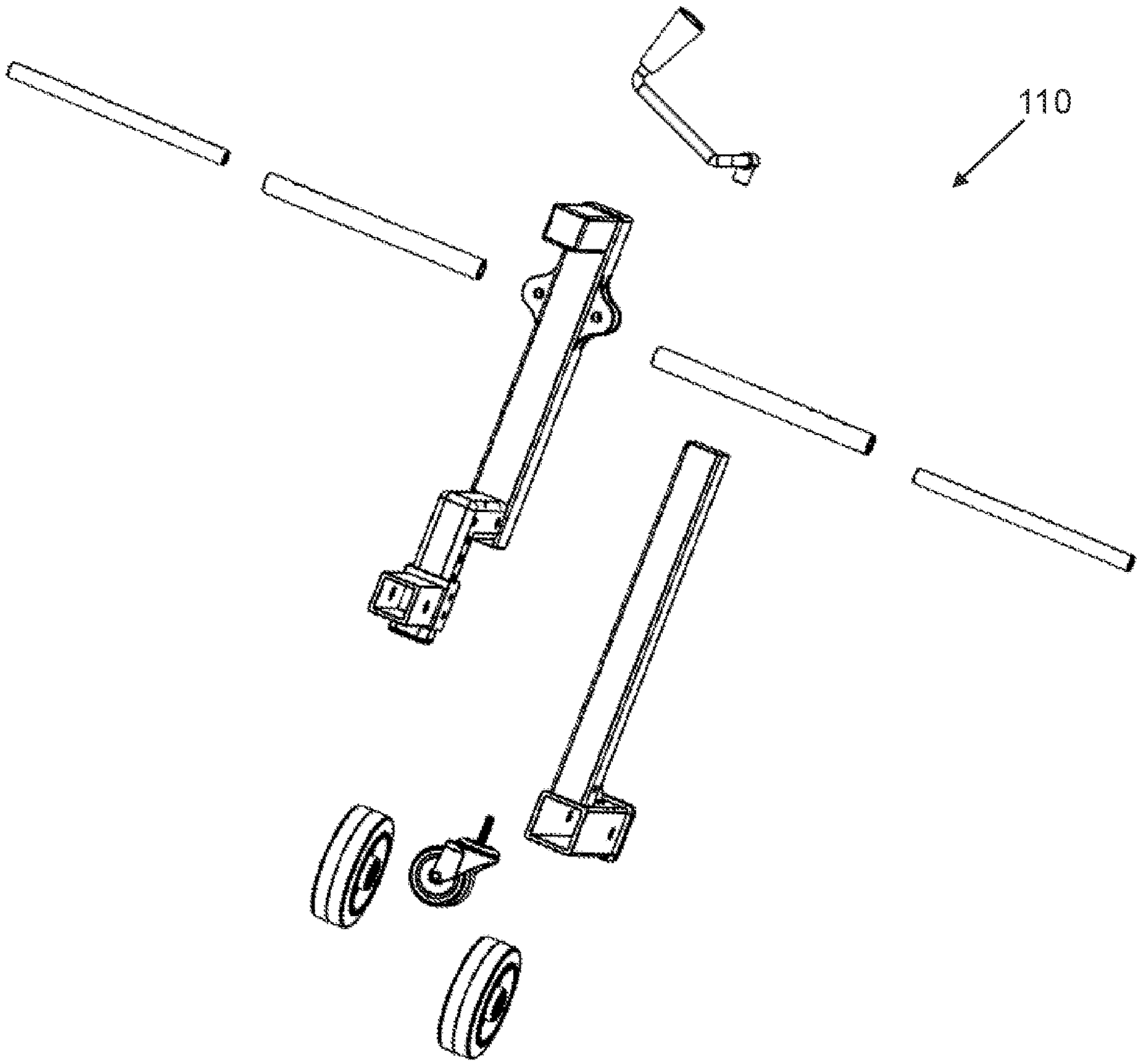
FIG. 3F is a top front exploded perspective view of a jack hitch device, according to an embodiment of the invention.
Figure 3G:
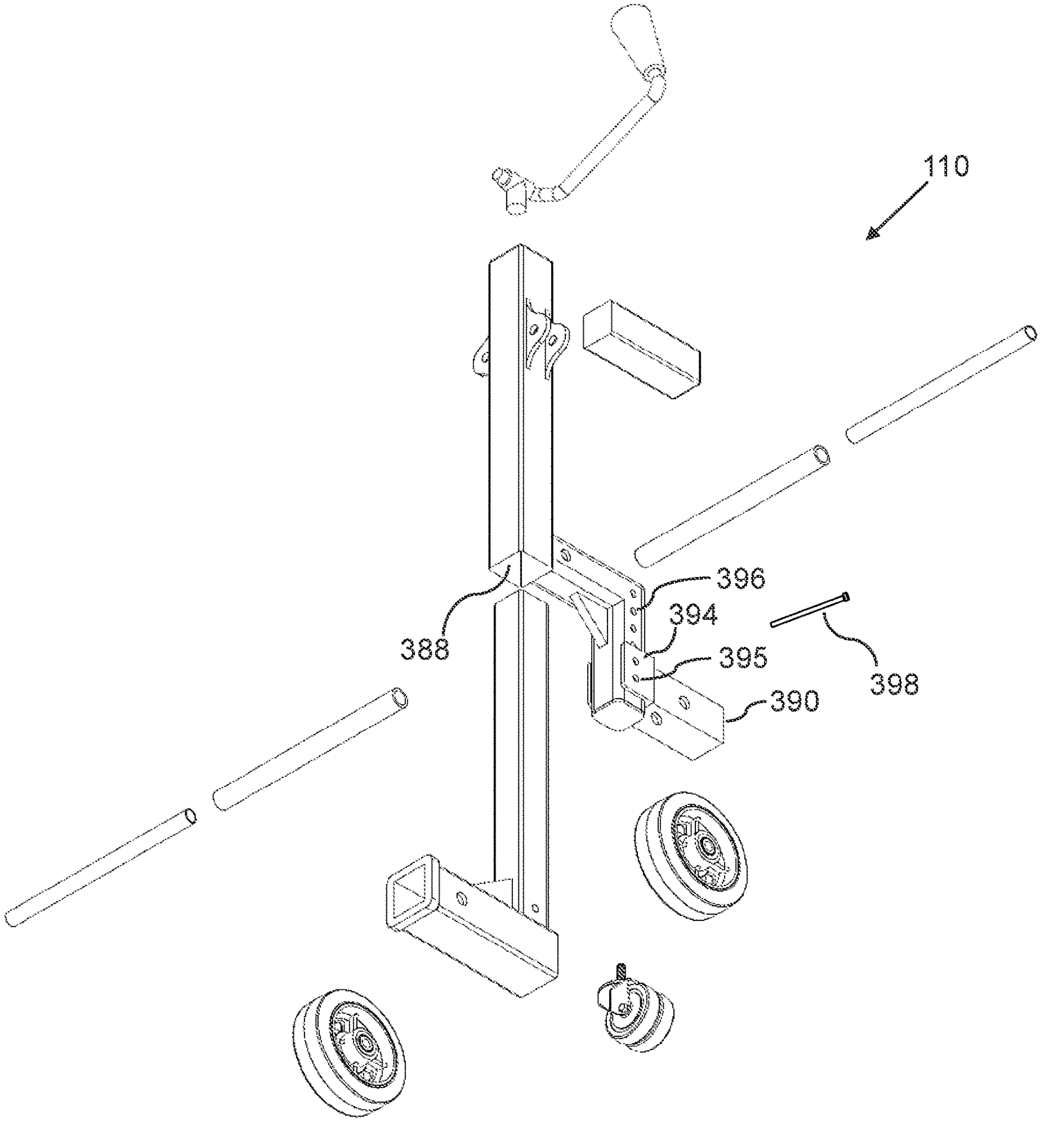
FIG. 3G is a bottom rear exploded perspective view of a jack hitch device, according to an embodiment of the invention.

In a related embodiment, as shown in FIGS. 3A-3F, the jack hitch device 110 can include an upper jack hitch assembly 302, which can include:

a) an upper elongated body 312, which can be hollow with an upper elongated interior 388, which can be configured with an upper rectangular cross-sectional shape, as shown in FIG. 3G;
b) a left handlebar 320, which can be pivotably 382 mounted to a left side of the upper elongated body 312, such that the left handlebar 320 can be positioned in a left stowed position 383 along the upper elongated body 312 and in a folded-out configuration, perpendicular to an elongated direction of the upper elongated body 312;
   wherein the left handlebar 320 can be configured to be length-adjustable and telescoping, such that the left handlebar 320 can further include:
      i. a left inner handle portion 321; and
      ii. a left outer handle portion 322;
      such that the left inner handle portion 321 is hollow and configured to slidably receive the left outer handle portion 322, which is configured to slide into the left inner handle portion 321;
c) a right handlebar 325, which can be pivotably 384 mounted to a right side of the upper elongated body 312, such that the right handlebar 325 can be positioned in a right stowed position 385 along the upper elongated body 312 and in a folded-out configuration, perpendicular to an elongated direction of the upper elongated body 312;
   wherein the right handlebar 325 can be configured to be length-adjustable and telescoping, such that the right handlebar 325 can further include:
      i. a right inner handle portion 326; and
      ii. a right outer handle portion 327;
      such that the right inner handle portion 326 is hollow and configured to slidably receive the right outer handle portion 327, which is configured to be slidable into the right inner handle portion 326.

In a further embodiment, the left inner handle portion 322 and the right inner handle portion 326 can respectively include respectively a left plurality of handle apertures 323 and a right plurality of handle apertures 328, such that the left outer handle portion 321 and the right outer handle portion 327 further include respectively a left spring button lock 324 and a right spring button lock 329; such that each of the left outer handle portion 321 and the right outer handle portion 327 are detachably lockable in a selected extended position, with a corresponding spring button lock 324, 329 protruding through a corresponding selected aperture 323, 328.

In a further related embodiment, as shown in FIGS. 3A-3F, the jack hitch device 110 can further include a lower jack hitch assembly 304, which can include:

a) a lower elongated body 314, which can be configured with a lower rectangular cross-sectional shape, such that the lower elongated body 314 is configured to be slidable into the upper elongated interior of the upper elongated body 312, such that the upper rectangular cross-sectional shape the and lower rectangular cross-sectional shape prevent rotation of the lower elongated body 314 inside the upper elongated interior;

b) left and right wheels 332, 334, which can be rotatably mounted to a lower end of the lower elongated body 314, on lower left and right sides of the lower elongated body 314, respectively;

c) a rear mounting piece 336, which is hollow and comprises a rear mounting interior 338, wherein the rear mounting piece 336 can be perpendicularly connected to a rear side of a lower end of the lower elongated body 314, such that the rear mounting piece 336 is configured to connect to (i.e., mount) an accessory, such as the jack hitch platform 120, on a rear side of the jack hitch device 110.

Figure 5A:
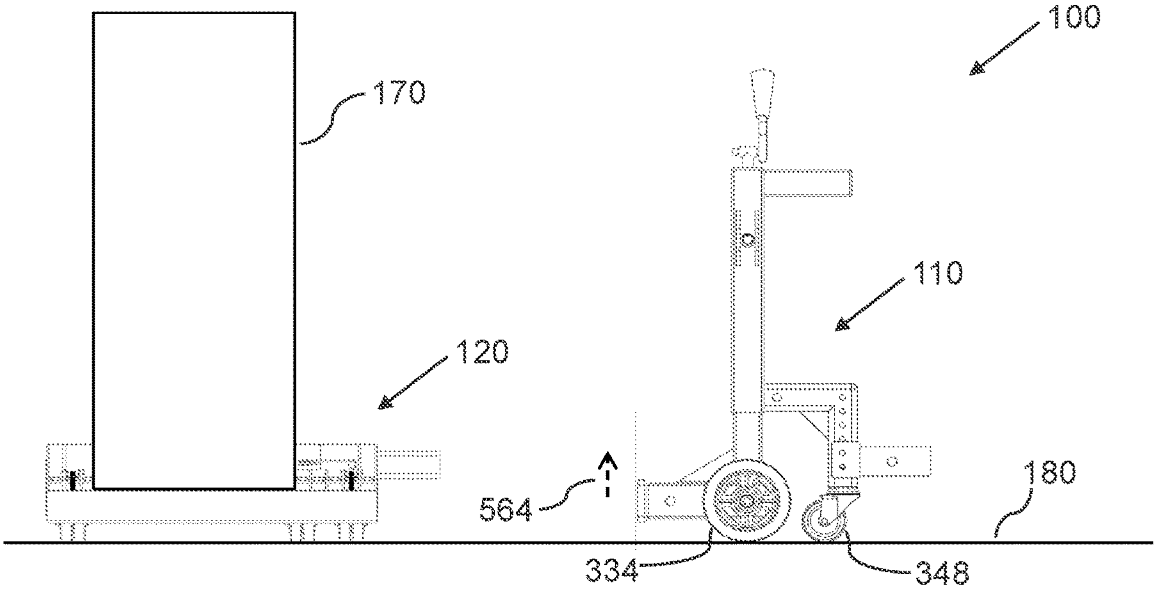
FIG. 5A is a right side view of a first process step of using a jack hitch system, according to an embodiment of the invention.

In a further related embodiment, as shown in FIGS. 3A-3F, the upper jack hitch assembly 302 of the jack hitch device 110 can further include:

a) an l-shaped member 340, which can include:
   i. a horizontally protruding piece 342, such that an inner end of the horizontally protruding piece 342 is connected to a front of a lower end of the upper elongated body 312; and
   ii. a vertically protruding piece 344, such that an upper end of the vertically protruding piece 344 is connected to an outer end of the horizontally protruding piece 242;

b) a front mounting piece 346, wherein the front mounting piece 346 can be perpendicularly connected to a front side of a lower end of the vertically protruding piece 344, such that the front mounting piece 346 is configured to attach to a hitch mount 162 of a vehicle 160;

c) at least one front wheel 348, which can be mounted on a lower end of the vertically protruding piece 344, such that the jack hitch device 110 can be configured to stand independently on the left and right rear wheels 332, 334 and the at least one front wheel 348, with the at least one front wheel 348 set at level with the left and right rear wheels 332, 334, as shown in FIG. 5A;

d) a lifting assemblage 350, which can include:
   i. an interior lifting assembly 352, which is connected between the upper elongated body 312 and the lower elongated body 314, such that the interior lifting mechanism 352 is configured to vertically move 363, 365, i.e. lift/retract 363 or lower/extract 365, the lower elongated body 314 relative to the upper elongated body 312;
   ii. a rotatable handle 354, which is connected to the interior lifting assembly 352, wherein the rotatable handle 354 is configured such that:
      1. rotation of the rotatable handle 354 in a first handle direction 362 causes the interior lifting assembly 352 to lift/retract 363 the lower elongated body 314 relative to the upper elongated body 312; and
      2. rotation of the rotatable handle 354 in a second handle direction 364 causes the interior lifting assembly 352 to lower/extend 365 the lower elongated body 314 relative to the upper elongated body 312;
   iii. an electric motor 356, which comprises a rotatable shaft 357, wherein the electric motor 356 is connected to the upper elongated body 312 (such as for example via a motor housing 378, which is connected to the upper elongated body 312, wherein the electric motor 356 is mounted inside the motor housing 378) and the rotatable shaft 357 is connected to the interior lifting assembly 352, wherein the electric motor 356 is configured such that:
      1. rotation of the rotatable shaft 357 in a first motor direction 372 causes the interior lifting assembly 352 to lift/retract 363 the lower elongated body 314 relative to the upper elongated body 312; and
      2. rotation of the rotatable shaft 357 in a second motor direction 374 causes the interior lifting assembly 352 to lower/extend 365 the lower elongated body 314 relative to the upper elongated body 312.

In a related embodiment, the interior lifting assembly 352 can further include a mechanical rotational translation assembly, which can be configured to translate a handle vertical rotation orientation of the rotatable handle 354 to a uniform horizontal rotation orientation to match a motor horizontal rotation orientation of the rotatable shaft 357 of the electric motor 356; or alternatively can be configured to translate a motor horizontal rotation orientation of the rotatable shaft 357 of the electric motor 356 to a uniform vertical rotation orientation to match a handle vertical rotation orientation of the rotatable handle 354.

In a related embodiment, the jack hitch device 110, can include an electric control system 600, which can include:

a) the electric motor 356;

b) an electric socket 612, which can receive a hitch power plug 670 of the vehicle (or a power plug from another power source), to provide power to the electric control system 600 via internal power wiring 632 of the electric control system 600;

c) optionally, a rechargeable battery 613;

d) a controller 614 (or control processor), which can be a simple electronic circuit or a micro-controller with an onboard controller, or another type of control circuit or computer device;

e) an on/off switch 616, which is configured to enable control by a user 680 of switching power to the electric control system on and off;

f) a direction button 620, which is configured to enable control of a direction of the electric motor 356 by a user 680, such that pressing on a first side 621 causes a rotation of the rotatable shaft 357 in a first motor direction 372, and such that pressing on a second side 622 causes a rotation of the rotatable shaft 357 in a second motor direction 374;

g) a power wiring 632, which transfers electric power to the electric engine; and h) a control wiring/bus 634, which transfers control signals from control buttons 616, 620 to the controller 614.

In a yet further related embodiment, the front mounting piece 346 can be vertically adjustable, such that the front mounting piece 346 can be securable/lockable in a selected position along the vertically protruding piece 344.

In a yet further related embodiment, the front mounting piece 346 can further include a front mounting body 390, left and right flanges 392, 394 (attached to the front mounting body 390) with corresponding left and right apertures 393, 395, and the vertically protruding piece 344 can include a plurality of mounting apertures 396, such that the front mounting piece 346 can be secured in a selected position with at least one lock pin 398 protruding through the corresponding left and right apertures 393, 395, and a selected mounting aperture 396; i.e., such that the front mounting piece 346 further comprises a left flange 392 and a right flange 394, including a corresponding left aperture 393 and a corresponding right aperture 395, respectively; and the vertically protruding piece 344 comprises a plurality of mounting apertures 396, such that the front mounting piece 346 is securable in a selected position with at a lock pin 398 protruding through the corresponding left aperture 393, the corresponding right aperture 393, and a selected mounting aperture 396 in the plurality of mounting apertures 393.

In a related embodiment, the interior lifting assembly 352 can be configured as a linear actuator, which can be a mechanical linear actuator (note that the assembly of the interior lifting assembly 352 and the electric motor 356 is an electro-mechanical linear actuator), wherein the mechanical linear actuator converts a rotary motion into a linear motion, such that the mechanical linear actuator can include various well-known designs, including:

a) Screw-based mechanical linear actuators, which can include leadscrew, screw jack, ball screw and roller screw mechanical linear actuators, wherein a rotation of the actuator's "nut" causes a linear motion of a "screw shaft"; and b) Wheel and axle based, which can include hoist, winch, rack and pinion, chain drive, belt drive, rigid chain, and rigid belt actuators, which all operate on the principle of a wheel and axle, wherein a rotating wheel moves a cable, rack, chain, or belt in a linear motion.

Figure 2A:
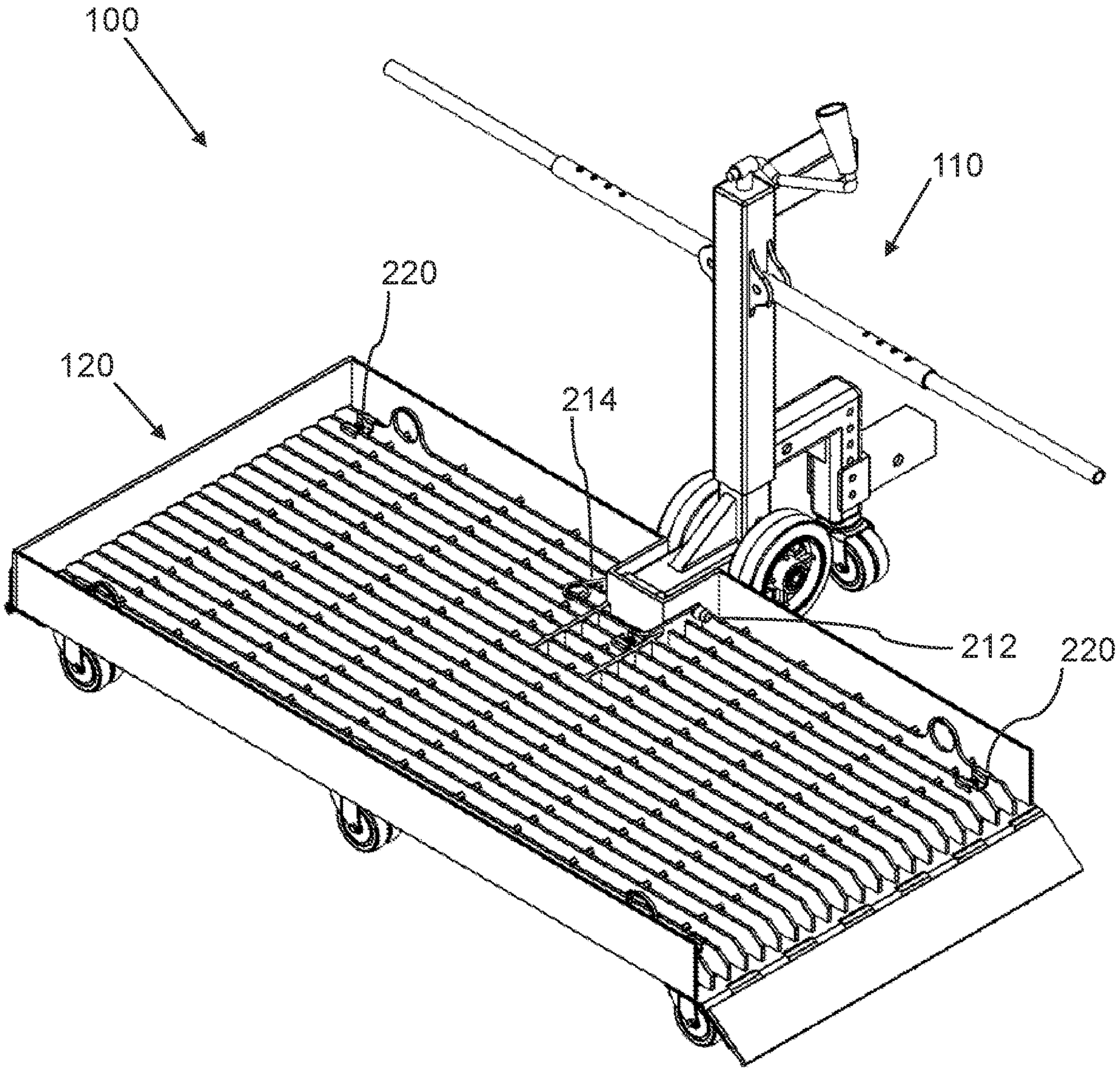
FIG. 2A is a rear top right perspective view of a jack hitch system, according to an embodiment of the invention.
Figure 2B:
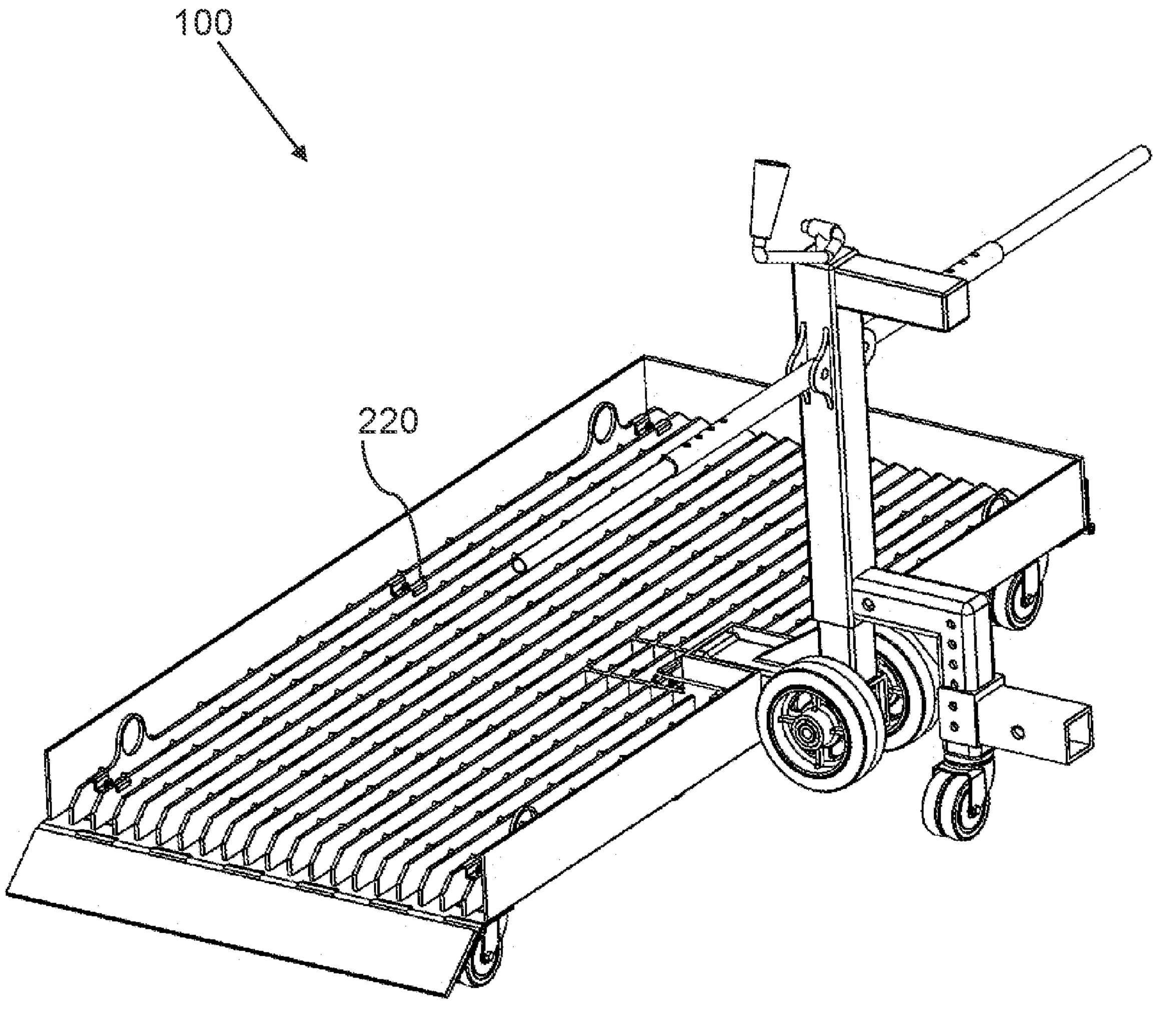
FIG. 2B is a front top right perspective view of a jack hitch system, according to an embodiment of the invention.
Figure 2C:
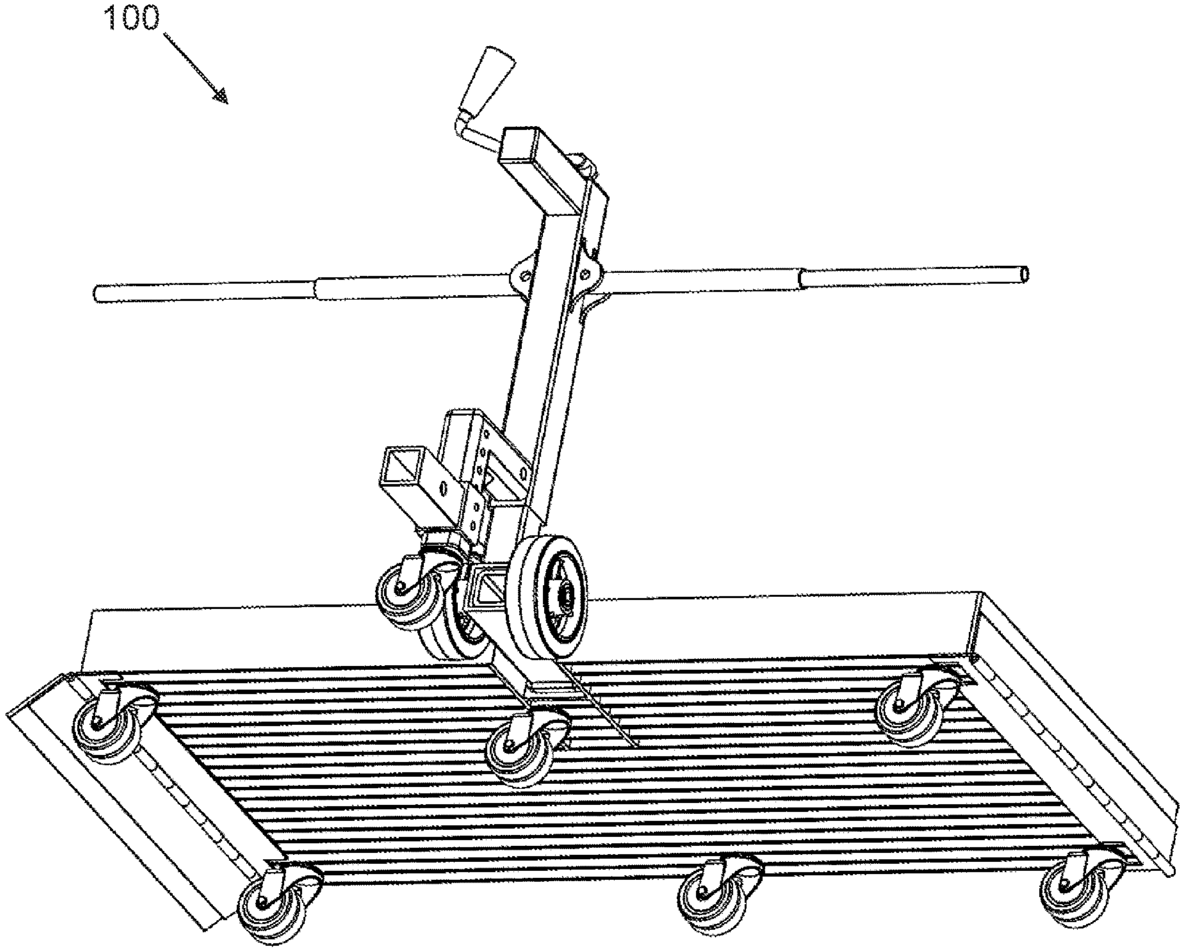
FIG. 2C is a front bottom left perspective view of a jack hitch system, according to an embodiment of the invention.
Figure 4A:
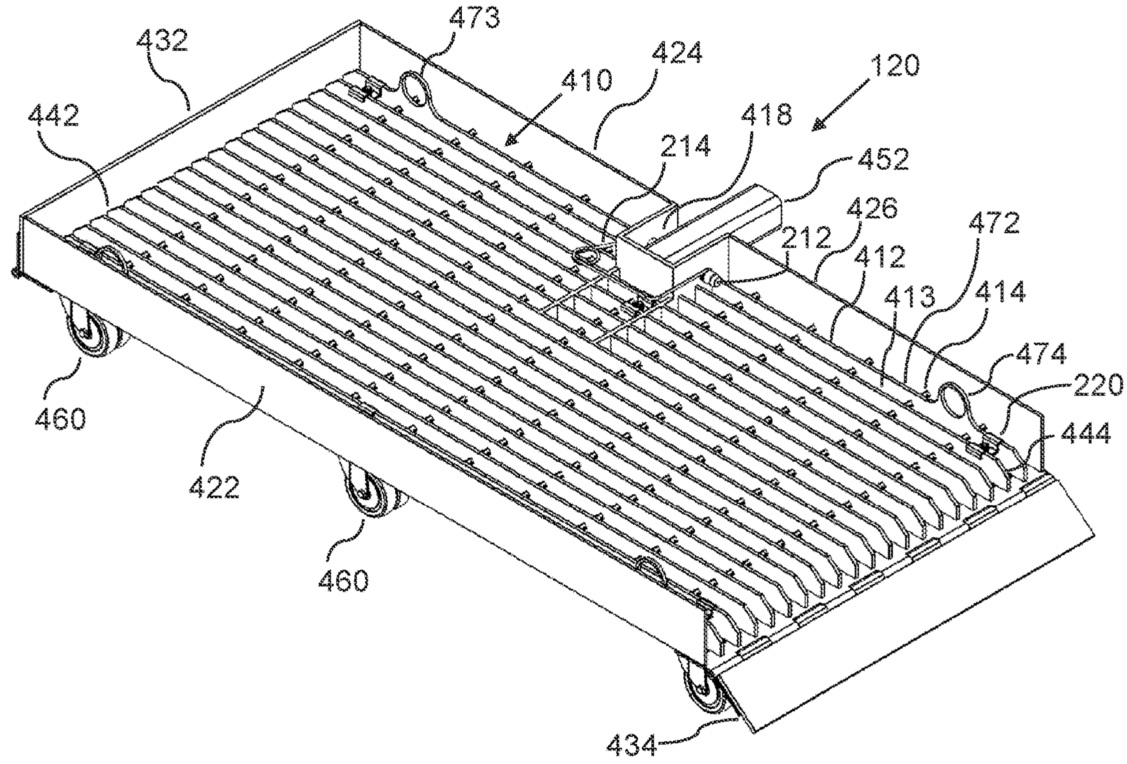
FIG. 4A is a rear top right perspective view of a jack hitch platform, according to an embodiment of the invention.
Figure 4B:
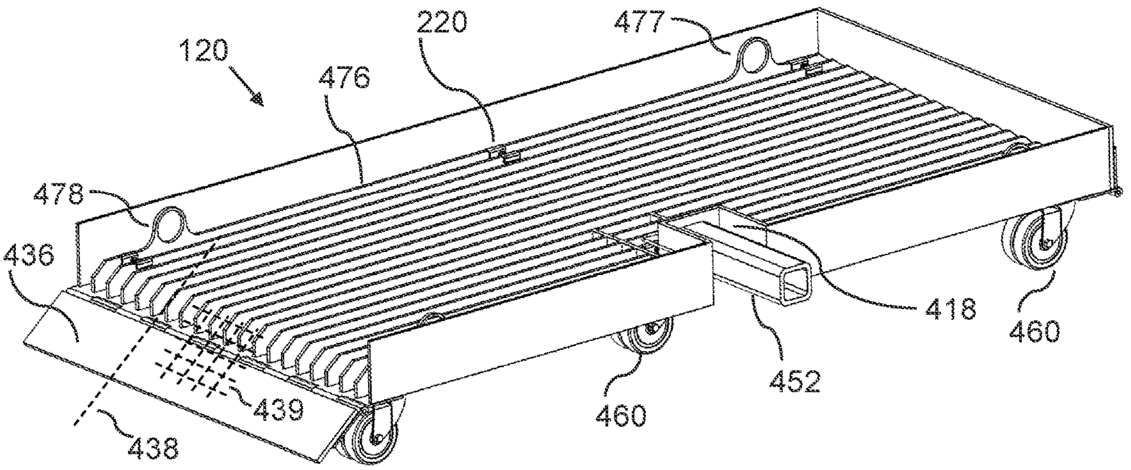
FIG. 4B is a front top right perspective view of a jack hitch platform, according to an embodiment of the invention.
Figure 4C:
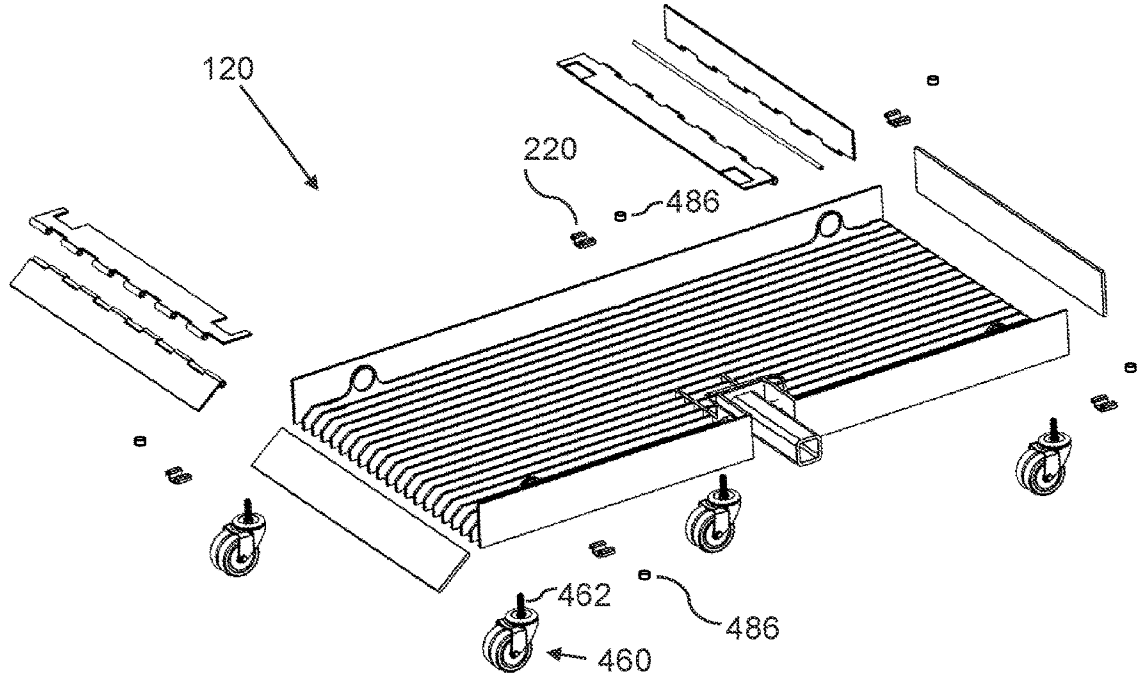
FIG. 4C is an exploded perspective view of a jack hitch platform, according to an embodiment of the invention.
Figure 4D:
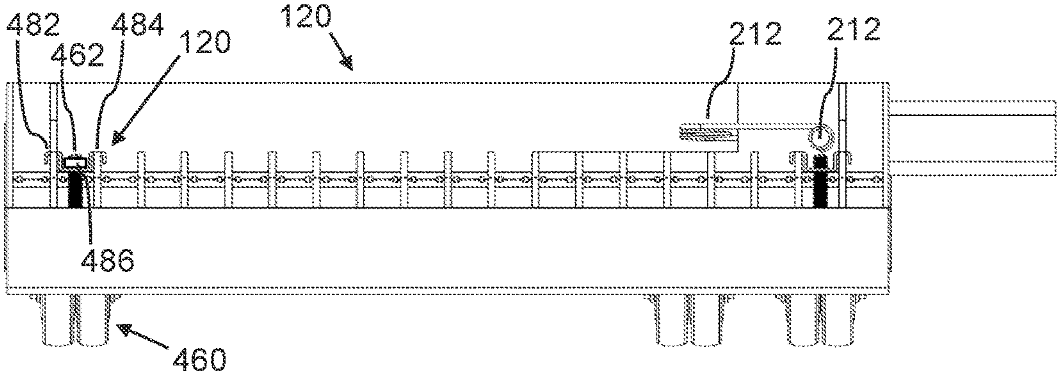
FIG. 4D is a right side view of a jack hitch platform, according to an embodiment of the invention.
Figure 4E:
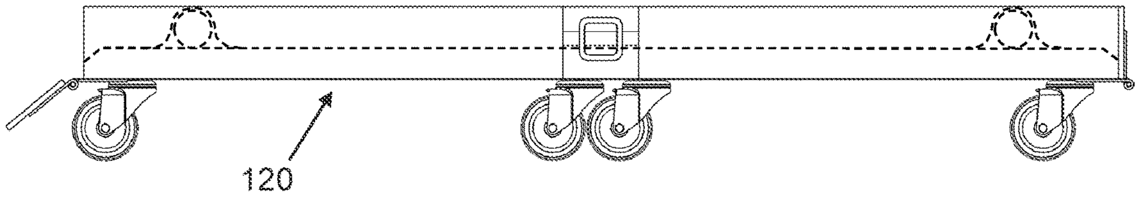
FIG. 4E is a front view of a jack hitch platform, according to an embodiment of the invention.

In a related embodiment, as shown in FIGS. 1, 2A-2C, and 4A-4E, the jack hitch platform 120, can include:

a) a platform surface 410, as shown in FIG. 4A, which can include:
   i. a plurality of vertically oriented longitudinal plates 412;
   ii. a plurality of connector rods 414, which laterally penetrate the vertically oriented longitudinal plates, such that the plurality of connector rods 414 stabilize the plurality of vertically oriented longitudinal plates 412;

b) a rear side panel 422;

c) left and right front panels 424, 426;

d) a right side pivotable panel 434, which is configured to pivot to a closed position in an upright/vertical orientation to close a circumference around the platform surface 410, and pivot to a folded down configuration, with an outer end of the right side pivotable panel 434 resting on an adjacent ground surface 180, such that the right side pivotable panel 434 facilitates loading of a cargo object 170 onto the platform surface 410;

e) a left side pivotable panel 432, which is configured to pivot to a closed position in an upright/vertical orientation to close a circumference around the platform surface 410, and pivot to a folded down configuration, with an outer end of the left side pivotable panel 432 resting on an adjacent ground surface 180, such that the left side pivotable panel 432 facilitates loading of a cargo object 170 onto the platform surface 410;

f) a plurality of pivotable wheels 460 mounted to a bottom surface of the platform surface 410, such as six pivotable wheels 460 as shown in FIG. 2C, which can also be referred to a roller wheels or caster wheels, i.e. rotatable wheels that can pivot 360 degrees, to allow rolling in any direction; and g) a front mounting connector 452, wherein the front mounting connector 452 can be connected to a front side of the platform surface 410, such that the front mounting connector 452 is configured to attach to a rear mounting piece 336 of the jack hitch device 110, for example using a pin 212 and mounting clip 214, as shown in FIGS. 2A, 4A, and 4D.

In related embodiments, the pivotable side panel 434, can be configured as left or right pivotable side panel 432, 434, or as a rear side pivotable panel 422 (which would allow loading onto a rear of the platform surface 410).

In a related embodiment, as shown in FIGS. 4A and 4B, a front-most longitudinal plate 412, 472 can further include left and right upward protruding front mounting points 473, 474 (each including a front mounting aperture); and a rear-most oriented longitudinal plate 412, 476 can further include left and right upward protruding rear mounting points 477, 478 (each including a rear mounting aperture); such that the left and right upward protruding front mounting points 473, 474 and the left and right upward protruding rear mounting points 477, 478 can be used as tie-down mounting points for securing a cargo object 170 on the platform surface 410, for example by using straps or cables.

In a related embodiment, as shown in FIGS. 2A and 4A, the platform surface 410 can further include:

a) a plurality of m-shaped mounting clips 220, each comprising:
   i. a first downward-facing u-shaped portion 482; and
   ii. a second downward-facing u-shaped portion 484;

wherein each of the pivotable wheels 460, can be mounted using an m-shaped mounting clip 220, such that the m-shaped mounting clip is configured to clip on top of a first vertically oriented longitudinal plate 412 and a second vertically oriented longitudinal plate 413 (with first and second u-shaped portions sliding onto the first vertically oriented longitudinal plate 412 and the second vertically oriented longitudinal plate 413, respectively), such that a nut 486 secures an upward protruding bolt 462 of the wheel 460, with the upward protruding bolt 462 protruding through an aperture of the m-shaped mounting clip 220, i.e. such that the corresponding m-shaped mounting clip 220 is configured to secure a corresponding pivotable wheel 460, with an upward protruding bolt 462 of the corresponding pivotable wheel 460 protruding through an aperture of the m-shaped mounting clip 220.

In a related embodiment, at least one side, or left and right sides of the platform surface 410 can be configured with a beveled cutoff 442, 444, which can be configured to align 438 with a top surface 436 of a respective left or right side pivotable panel 432, 434, such that the beveled cutoff 442, 444 a top surface 436 of a respective left or right side pivotable panel 432, 434 form combined a loading plane 439, when the respective left or right side pivotable panel 432, 434 is positioned in the folded down configuration, such that the alignment 438 of the top surface and the beveled cutoff 442, 444, facilitates loading of a cargo object 170 onto the platform surface 410.

In another related embodiment, a front side of the platform surface can be configured with a recess 418, such that the front mounting connector 452 is connected to a bottom of the recess 418, such that the front mounting connector 452 protrudes forward from the bottom of the recess 418, to facilitate a closer mounting between the jack hitch platform 120 and the jack hitch device 110.

Thus, in an embodiment, a jack hitch system 100, can include a jack hitch device 110, which is configured to be connected to a hitch mount 162 of a vehicle 160, such that the jack hitch device 110 is configured to accept a detachable connection of a jack hitch accessory device, such as a jack hitch platform 120; wherein the jack hitch device comprises:

a) an upper jack hitch assembly 302, which comprises an upper elongated body 312, which comprises an upper elongated interior;

b) a lower jack hitch assembly 304, which comprises a lower elongated body 314;

wherein at least an upper portion of the lower elongated body 314 is configured to be slidable into the upper elongated interior of the upper elongated body 312.

Figure 5B:
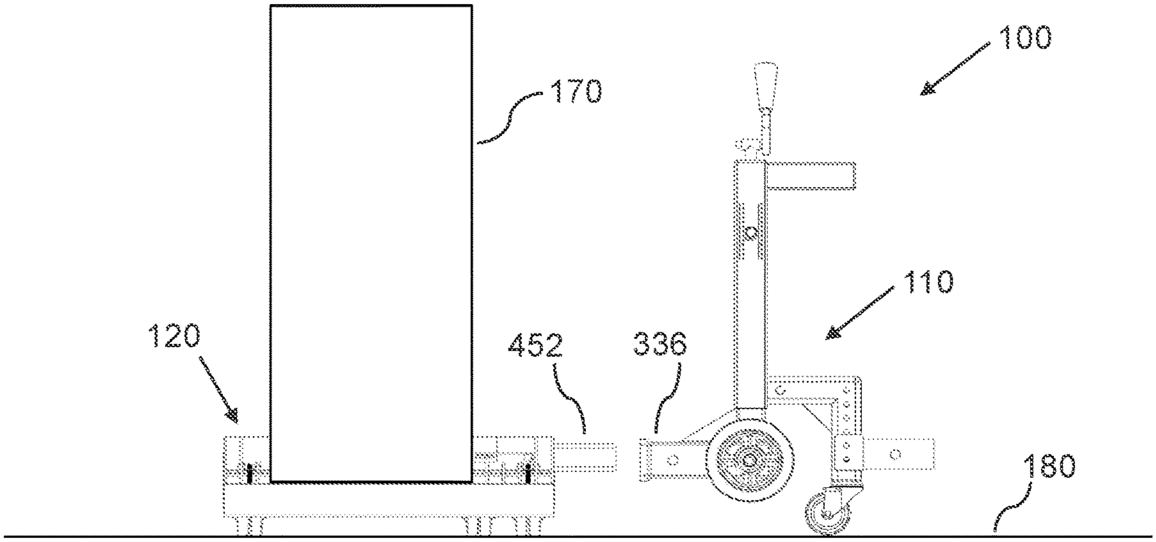
FIG. 5B is a right side view of a second process step of using a jack hitch system, according to an embodiment of the invention.
Figure 5C:
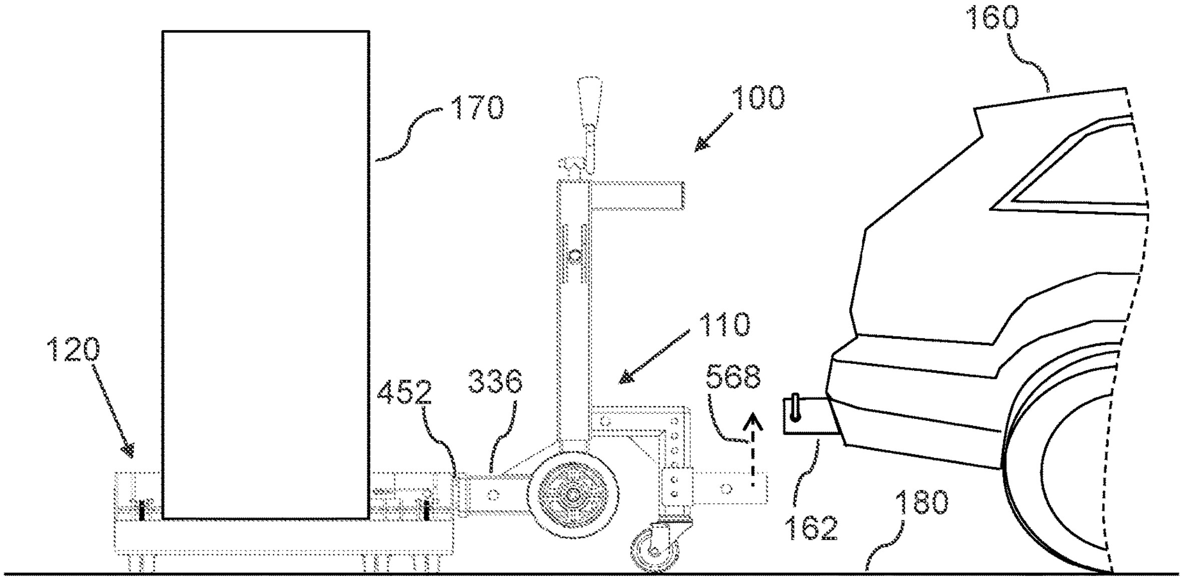
FIG. 5C is a right side view of a third process step of using a jack hitch system, according to an embodiment of the invention.
Figure 5D:
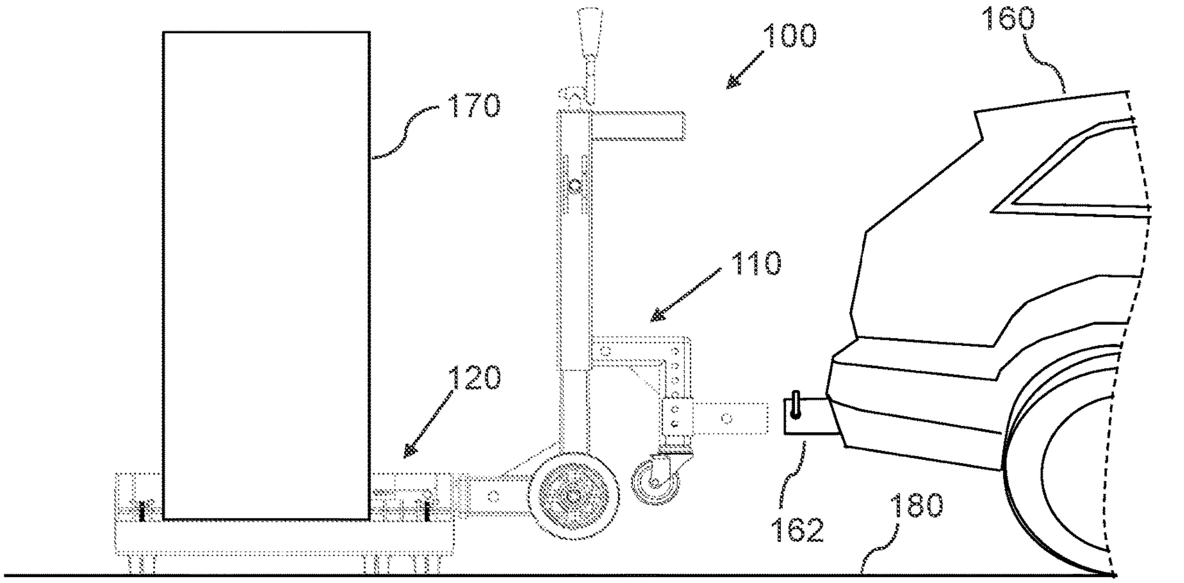
FIG. 5D is a right side view of a fourth process step of using a jack hitch system, according to an embodiment of the invention.
Figure 5E:
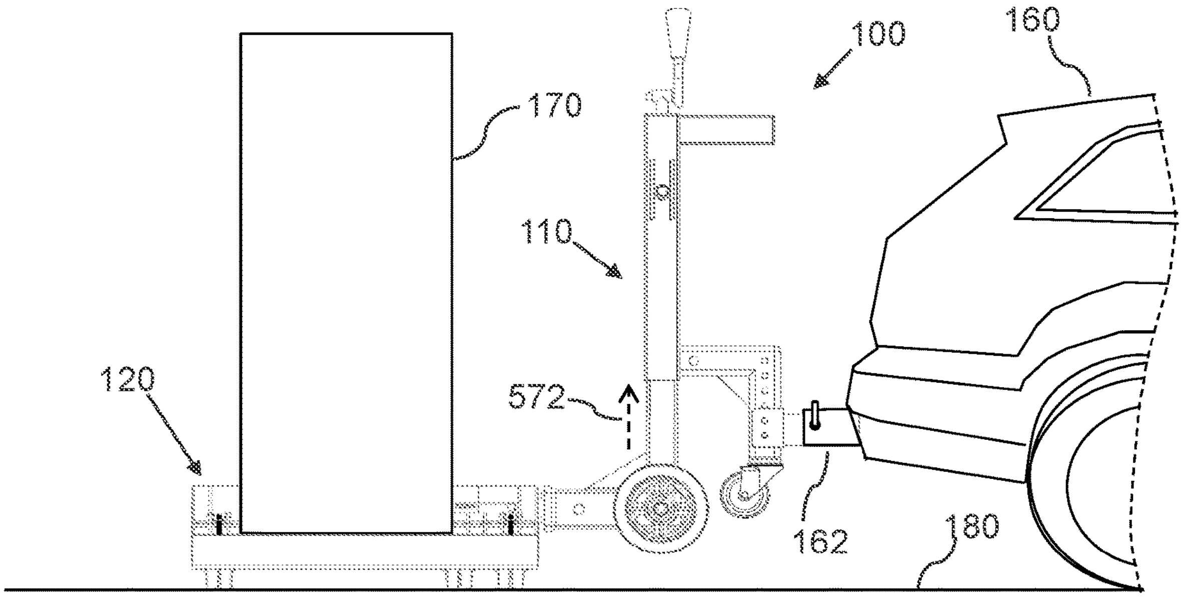
FIG. 5E is a right side view of a fifth process step of using a jack hitch system, according to an embodiment of the invention.
Figure 6:
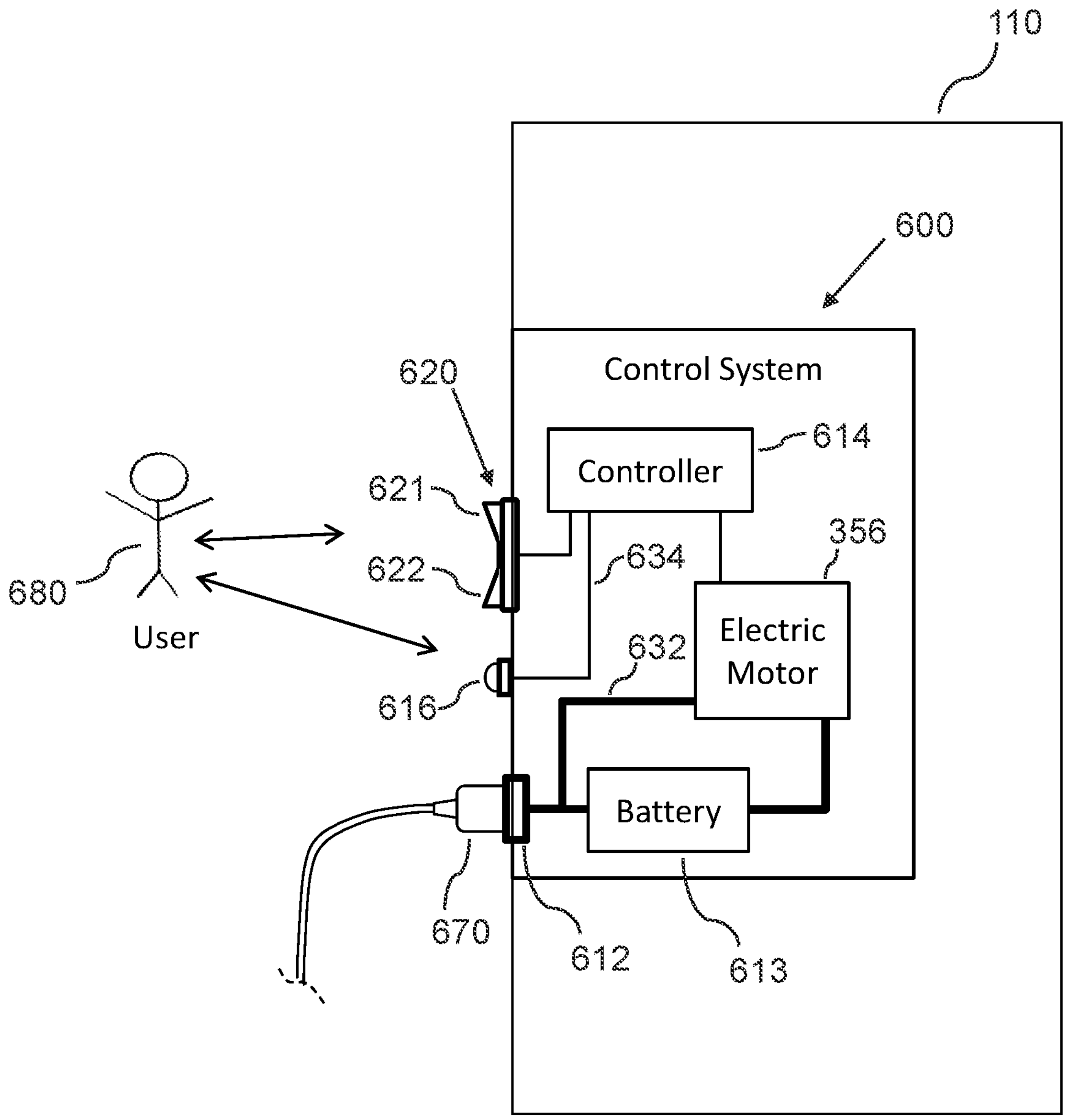
FIG. 6 is a schematic diagram illustrating a jack hitch control system, according to an embodiment of the invention.
Figure 7:
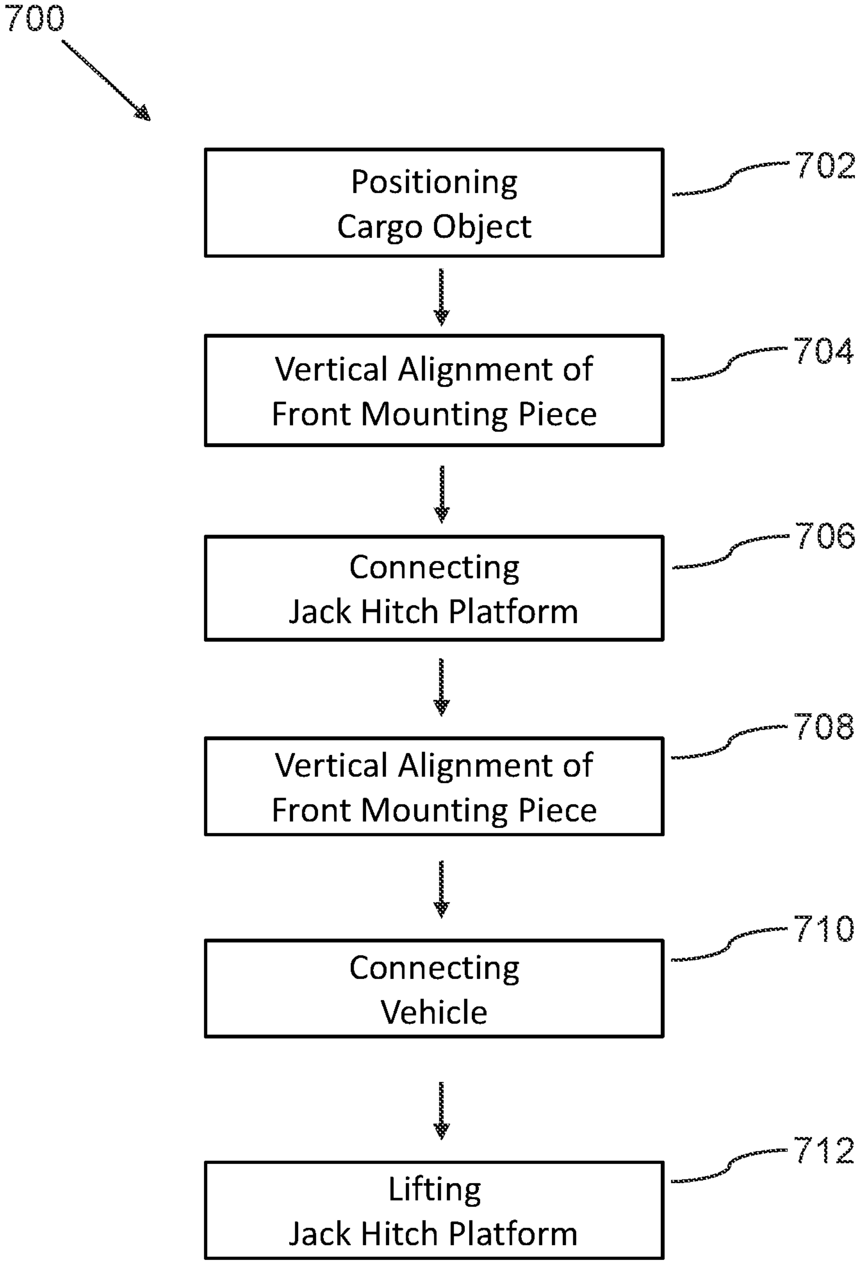
FIG. 7 is a flowchart illustrating steps that may be followed, in accordance with one embodiment of a method or process of using a jack hitch system.

In an embodiment, as illustrated in FIGS. 1, 5A-5E and 7, a jack hitch method 700 for using a jack hitch system 100, can include:

a) Positioning 702 a cargo object 170 onto a jack hitch device 110, as shown in FIG. 5A;

b) Vertically aligning 704 a height of a rear mounting piece 336 of the jack hitch device 110, by vertically adjusting 564 the lower elongated body 314 relative to the upper elongated body 312 of the jack hitch device 110, such that the rear mounting piece 336 of the jack hitch device 110 is vertically aligned with the front mounting connector 452 of the jack hitch platform 120, as shown in FIG. 5B;

c) Connecting 706 the jack hitch device 110 with the jack hitch platform 120, by connecting the rear mounting piece 336 with the front mounting connector 452, as shown in FIGS. 5B and 5C;

d) Vertically aligning 708 a height of a front mounting piece 346 of the jack hitch device 110, by vertically adjusting 568 the upper elongated body 312 relative to the lower elongated body 314 of the jack hitch device 110, such that the front mounting piece 346 of the jack hitch device 110 is vertically aligned with the hitch mount 162 of the vehicle 160, as shown in FIG. 5D;

e) Connecting 710 the jack hitch system 100 with the vehicle 160, by connecting the front mounting piece 346 with the hitch mount 162, as shown in FIG. 5E; and f) Lifting 712 the jack hitch platform 120 (with the cargo object 170) from the ground surface 180, by vertically lifting 572 the lower elongated body 314 relative to the upper elongated body 312 of the jack hitch device 110, as shown in FIG. 5E, such that the vehicle 160 is prepared for driving with the jack hitch system 100 attached, as shown in FIG. 1.

Thus, in various related embodiments, the jack hitch system 100 can include:

a) A foot pad with wheel support, wherein:

i. At the base of the Jack Hitch is a support plate with radiused edges like the removable foot on a trailer jack preventing the jack stand from sinking into the ground. This support plate can have pre-located mounting holes integrated into the radiused edges for optional wheel installation. When installed, the user can wheel the Jack Hitch to a vehicle for transport;

b) Integrated Support Plate for carrying trash cans, dirt bikes, etc., wherein:

i. A trailer support plate utilizes a square metal tube that inserts into the vehicles trailer hitch. The proposed design of this support plate allows for centering the weight of the items on the plate by moving the trailer hitch assembly into the center of the support plate. It is like an interlock feature where the support plate slides further into the trailer hitch moving the center of gravity closer to the vehicle and limiting rotation and increasing the maximum supported weight;

c) Integrated jack that allows weight to be lifted and locked, wherein:

i. Trailer jacks are designed to lift weight by extending the piston to force up the trailer allowing for the vehicle to then receive the hitch. This design includes the opposite jack feature. The ability to now lift (retract) the piston enabling the lift of the items at a defined maximum weight. This can be achieved manually, automatically or a combination of both. For example, when the Jack Hitch is mounted into a vehicle receiver, the jack is capable of lowering the support plate to the ground to load trash cans. Then the Jack Hitch can lift the weight of the items on the support plate into position for transport. This may include a manual lock pin (clevis) to prevent accidental failure during transport;

d) Anti-Spin technology for mounted products. (Square Component Design), wherein:

i. The anti-spin feature is simply designing a Jack Hitch with integrated ribs, square tube stock, etc., preventing the lateral rotation of a legacy round tube jack stand. This can be accomplished again through design and manual verification similar to the use of a lock pin (clevis) to prevent accidental failure during transport;

e) Lift and Level feature. (Allowing for alignment with the vehicle hitch, wherein:

i. The lift and level feature uses the suggested Jack Hitch lift feature described above. Coupled with an integrated bubble level or digital level the Jack Hitch receiver can then ensure the towed accessory is leveled correctly or can be adjusted to accommodate rougher terrain. This can be integrated with a maximum level adjustment of −30 degrees to +30 degrees. (Limited to the height and weight of the items being towed);

f) Mobility Wheels for the accessories and the trailer hitch, wherein:

i. As described above, the primary Jack Hitch vehicle receiver can be designed with pre-located mounting holes integrated into the receiver tube for optional wheel installation. (Identical to the design of the foot pad described above) This now allows a user to install and utilize four wheels enabling the movement of the entire Jack Hitch system, thereby providing the ability to wheel the Jack Hitch into position and easily insert into the trailer hitch;

g) Snap in Mobility wheels for accessories. (Mesh Towing Support Plate), wherein:

i. As described for the Jack Hitch mobility wheels, this introduces the ability to install snap in, 360-degree industrial wheels into the frame of the mesh towing support plate. This allows for rolling the mesh support plate into position for the Jack Hitch receiver; and ii. When using the optional mesh towing plate with the integrated mobility wheels, items like wheelchairs, dirt bikes, motorcycles, kayaks, camping gear etc. can be moved to and aligned to the vehicle receiver for ease of installation. (Move the trailer not the vehicle);

h) Integrated mobility handle for wheeling the unit or accessories, wherein:

i. The Jack Hitch can include a convenient ergonomic handle at the upper portion of the jack stand. This is utilized to push and pull of the Jack Hitch and any installed accessories. This can provide access similar to a hospital IV stand with wheels; and i) Integrated lighting for on road use, wherein:

i. The Jack Hitch can include the option to add LED marker lights and/or integrated brake and reverse lights when utilizing the vehicle trailer light plug.

Figure 8A:
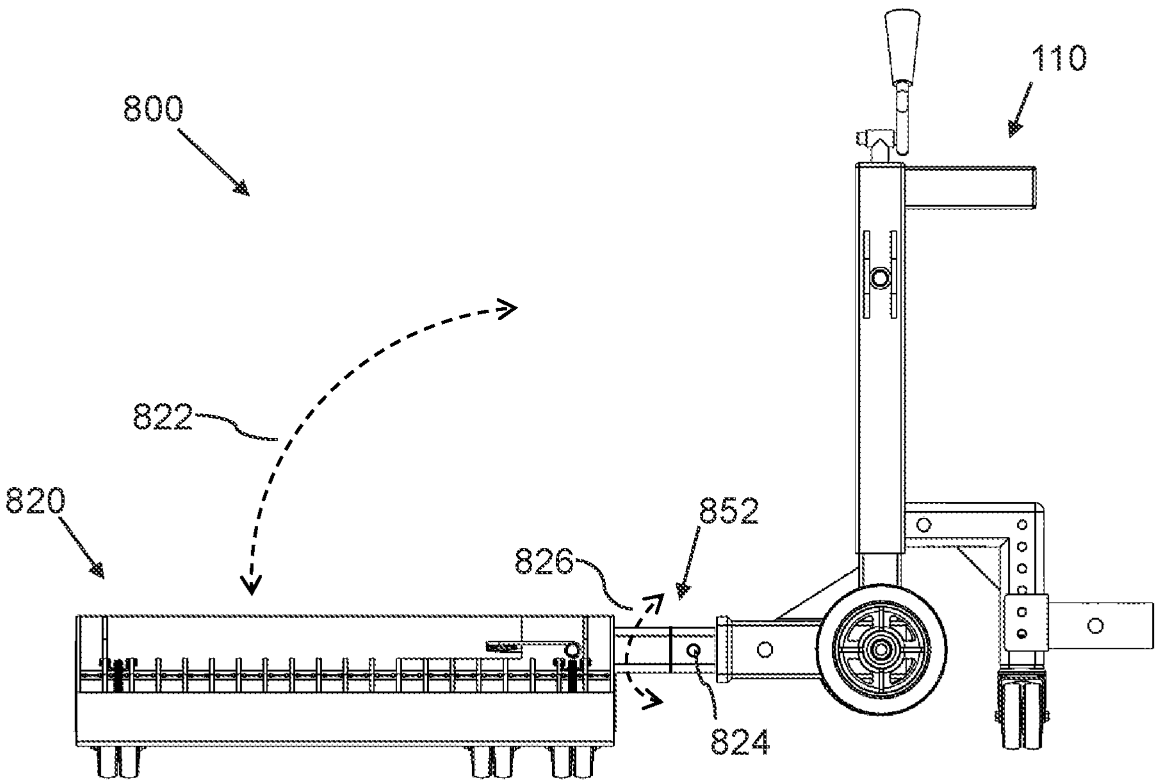
FIG. 8A is a left side view of a jack hitch device in a pivoted-down configuration, according to an embodiment of the invention.
Figure 8B:
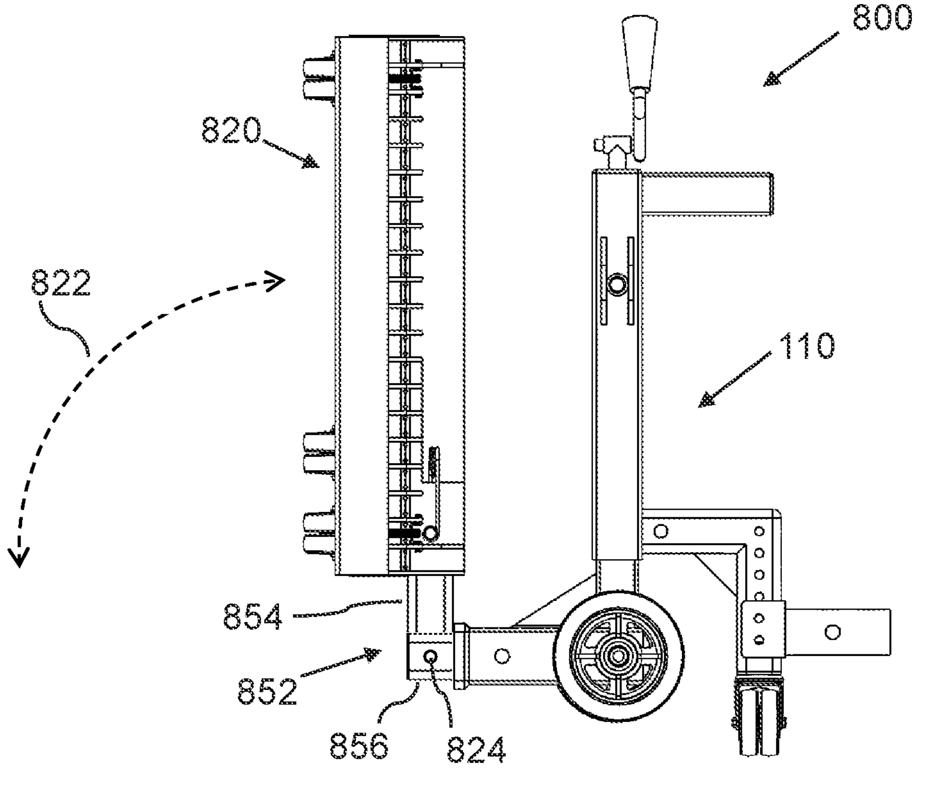
FIG. 8B is a left side view of a jack hitch device in a pivoted-up configuration, according to an embodiment of the invention.

In a related embodiment, as shown in FIGS. 8A-8A and FIGS. 2A-2C, a jack hitch system 100, 800 can include:

a) a jack hitch device 110, which is configured to be detachably connected to a hitch mount 162 of a vehicle 160; and b) a jack hitch platform 820, which is configured to be attached to the jack hitch device 110, such that the jack hitch platform 120 is configured to receive a cargo object 170 for transportation, such as a tool box, trash can, cooler, refrigerator, suitcase, luggage, tool box, moving box, general box, or other type of object, such that the cargo object 170 is positioned on a surface of the jack hitch platform 120;

wherein a main body of the jack hitch platform 820 is pivotable 822 between a pivoted-down position (as shown in FIG. 8A) for use with a mounted cargo object 170 and a pivoted-up position (as shown in FIG. 8B) for use during transport or storage without a mounted cargo object 170.

In a further related embodiment, a front mounting connector 452, 852 can for example comprise an inner portion 854 and an outer portion 856, which are pivotably connected with a connecting lockable pivot point/axle 824, to enable a lockable pivoting 826 of an inner portion of the front mounting connector 452, 852, which enables pivoting 822 of the main body of the jack hitch platform 820.

Here has thus been described a multitude of embodiments of the jack hitch system 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A jack hitch system, comprising:

a) a jack hitch device, which is configured to be connected to a hitch mount of a vehicle; and b) a jack hitch platform, which is configured to be detachably connected to the jack hitch device, wherein the jack hitch platform is configured to receive a cargo object for transportation;

wherein the jack hitch device comprises an upper jack hitch assembly, which comprises:

an upper elongated body;

a left handlebar, which is pivotably mounted to a left side of the upper elongated body, such that the left handlebar is configured to be positionable in a left stowed position along the upper elongated body, and such that the left handlebar is configured to be positionable in a left folded-out configuration, which is perpendicular to an elongated direction of the upper elongated body; and a right handlebar, which is pivotably mounted to a right side of the upper elongated body, such that the right handlebar is configured to be positionable in a right stowed position along the upper elongated body, and such that the right handlebar is configured to be positionable in a right folded-out configuration, which is perpendicular to the elongated direction of the upper elongated body.

2. The jack hitch system of claim 1, wherein the upper elongated body is hollow and comprises an upper elongated interior.

3. The jack hitch system of claim 2, wherein the upper elongated interior is configured with an upper rectangular cross-sectional shape.

4. The jack hitch system of claim 3, wherein the jack hitch device further comprises a lower jack hitch assembly, which comprises:

a lower elongated body, which is configured with a lower rectangular cross-sectional shape, such that the lower elongated body is configured to be slidable into the upper elongated interior of the upper elongated body, such that the upper rectangular cross-sectional shape and the lower rectangular cross-sectional shape prevent rotation of the lower elongated body inside the upper elongated interior.

5. The jack hitch system of claim 2, wherein the jack hitch device further comprises a lower jack hitch assembly, which comprises:

a lower elongated body, which is configured to be slidable into the upper elongated interior of the upper elongated body; and left and right rear wheels, which are rotatably mounted to a lower end of the lower elongated body, on lower left and right sides of the lower elongated body, respectively.

6. The jack hitch system of claim 5, wherein the lower jack hitch assembly further comprises:

a rear mounting piece, which is hollow and comprises a rear mounting interior, wherein the rear mounting piece is connected to a rear side of a lower end of the lower elongated body, such that the rear mounting piece is configured to connect to the jack hitch platform on a rear side of the jack hitch device.

7. The jack hitch system of claim 5, wherein the upper jack hitch assembly of the jack hitch device further comprises:

a) an l-shaped member, comprising:

a horizontally protruding piece, such that an inner end of the horizontally protruding piece is connected to a front of a lower end of the upper elongated body; and a vertically protruding piece, such that an upper end of the vertically protruding piece is connected to an outer end of the horizontally protruding piece; and b) at least one front wheel, which is mounted on a lower end of the vertically protruding piece, such that the jack hitch device is configured to stand independently on the left and right rear wheels and the at least one front wheel, when the at least one front wheel is at level with the left and right rear wheels.

8. The jack hitch system of claim 7, wherein the upper jack hitch assembly of the jack hitch device further comprises:

a front mounting piece, wherein the front mounting piece is perpendicularly connected to a front side of a lower end of the vertically protruding piece, such that the front mounting piece is configured to attach to the hitch mount of the vehicle.

9. The jack hitch system of claim 8, wherein the front mounting piece is configured to be vertically adjustable, such that the front mounting piece is lockable in a selected position along the vertically protruding piece.

10. The jack hitch system of claim 9, wherein the front mounting piece further comprises a left flange and a right flange, including a corresponding left aperture and a corresponding right aperture, respectively; and the vertically protruding piece comprises a plurality of mounting apertures, such that the front mounting piece is securable in a selected position with at a lock pin protruding through the corresponding left aperture, the corresponding right aperture, and a selected mounting aperture in the plurality of mounting apertures.

11. The jack hitch system of claim 5, wherein the upper jack hitch assembly of the jack hitch device further comprises a lifting assemblage, which comprises:

an interior lifting assembly, which is connected between the upper elongated body and the lower elongated body, such that the interior lifting mechanism is configured to vertically move the lower elongated body relative to the upper elongated body.

12. The jack hitch system of claim 11, wherein the lifting assemblage further comprises:

a rotatable handle, which is connected to the interior lifting assembly, wherein the rotatable handle is configured such that:

a first rotation of the rotatable handle in a first handle direction causes the interior lifting assembly to retract the lower elongated body relative to the upper elongated body; and a second rotation of the rotatable handle in a second handle direction causes the interior lifting assembly to extend the lower elongated body relative to the upper elongated body.

13. The jack hitch system of claim 11, wherein the lifting assemblage further comprises:

an electric motor, which comprises a rotatable shaft, wherein the electric motor is connected to the upper elongated body and the rotatable shaft is connected to the interior lifting assembly, wherein the electric motor is configured such that:

a first rotation of the rotatable shaft in a first motor direction causes the interior lifting assembly retract the lower elongated body relative to the upper elongated body; and a second rotation of the rotatable shaft in a second motor direction causes the interior lifting assembly to extend the lower elongated body relative to the upper elongated body.

14. The jack hitch system of claim 1, wherein the left handlebar is configured to be length-adjustable and telescoping, and wherein the right handlebar is configured to be length-adjustable and telescoping.

15. The jack hitch system of claim 14, wherein the left handlebar further comprises:

a left inner handle portion; and a left outer handle portion;

such that the left inner handle portion is hollow and configured to slidably receive the left outer handle portion, which is configured to slide into the left inner handle portion; and wherein the right handlebar further comprises:

a right inner handle portion; and a right outer handle portion;

such that the right inner handle portion is hollow and configured to slidably receive the right outer handle portion, which is configured to be slidable into the right inner handle portion.

16. The jack hitch system of claim 1, wherein the jack hitch platform further comprises:

a platform surface; and a right side pivotable panel, which is configured to pivot to a closed position in an upright orientation and pivot to a folded down configuration, with an outer end of the right side pivotable panel resting on an adjacent ground surface, such that the right side pivotable panel facilitates loading of the cargo object onto the platform surface.

17. The jack hitch system of claim 16, wherein the jack hitch platform further comprises:

a plurality of pivotable wheels, which are mounted to a bottom surface of the platform surface.

18. The jack hitch system of claim 16, wherein the jack hitch platform further comprises:

a front mounting connector, wherein the front mounting connector is connected to a front side of the platform surface, such that the front mounting connector is configured to attach to a rear mounting piece of the jack hitch device.

19. The jack hitch system of claim 18, wherein a front side of the platform surface is configured with a recess, such that the front mounting connector protrudes forward from a bottom of the recess, to facilitate a closer mounting between the jack hitch platform and the jack hitch device.

20. The jack hitch system of claim 16, wherein a right side of the platform surface is configured with a beveled cutoff, which is configured to align with a top surface of the right side pivotable panel, when the right side pivotable panel is positioned in the folded down configuration, such that an alignment of the top surface and the beveled cutoff facilitates the loading of the cargo object onto the platform surface.

21. The jack hitch system of claim 16, wherein the platform surface further comprises:

a plurality of vertically oriented longitudinal plates;

wherein a front-most longitudinal plate further comprises left and right upward protruding front mounting points, each including a front mounting aperture; and wherein a rear-most oriented longitudinal plate further comprises left and right upward protruding rear mounting points, each including a rear mounting aperture; such that the left and right upward protruding front mounting points and the left and right upward protruding rear mounting points are configured to be used as tie-down mounting points for securing the cargo object on the platform surface.

22. The jack hitch system of claim 16, wherein the platform surface further comprises:

a) a plurality of vertically oriented longitudinal plates;

b) a plurality of m-shaped mounting clips, each comprising:

a first downward-facing u-shaped portion; and a second downward-facing u-shaped portion;

wherein each corresponding m-shaped mounting clip is configured to clip on top of a first vertically oriented longitudinal plate and a second vertically oriented longitudinal plate, with first downward-facing u-shaped portion and the second downward-facing u-shaped portion sliding onto the first vertically oriented longitudinal plate and the second vertically oriented longitudinal plate, respectively;

such that the corresponding m-shaped mounting clip is configured to secure a corresponding pivotable wheel, with an upward protruding bolt of the corresponding pivotable wheel protruding through an aperture of the m-shaped mounting clip.

23. A jack hitch system, comprising a jack hitch device, which is configured to be detachably connected to a hitch mount of a vehicle, such that the jack hitch device is configured to accept a detachable connection of a jack hitch accessory device;

wherein the jack hitch device comprises:

a) an upper jack hitch assembly, which comprises an upper elongated body, which comprises an upper elongated interior; and b) a lower jack hitch assembly, which comprises a lower elongated body;

wherein at least an upper portion of the lower elongated body is configured to be slidable into the upper elongated interior of the upper elongated body.

24. The jack hitch system of claim 23, wherein the jack hitch accessory device is a jack hitch platform, which is configured to receive a cargo object for transportation.

25. A jack hitch method for using a jack hitch system, comprising:

a) positioning a cargo object onto a jack hitch device of the jack hitch system;

b) vertically aligning a height of a rear mounting piece of the jack hitch device, by vertically adjusting a lower elongated body relative to an upper elongated body of the jack hitch device, such that the rear mounting piece of the jack hitch device is vertically aligned with a front mounting connector of a jack hitch platform; and c) connecting the jack hitch device with the jack hitch platform, by connecting the rear mounting piece with the front mounting connector.

26. The jack hitch method of claim 25, further comprising:

a) vertically aligning a height of a front mounting piece of the jack hitch device, by vertically adjusting the upper elongated body relative to the lower elongated body of the jack hitch device, such that the front mounting piece of the jack hitch device is vertically aligned with a hitch mount of a vehicle; and b) connecting the jack hitch system with the vehicle, by connecting the front mounting piece with the hitch mount of the vehicle.

27. A jack hitch system, comprising:

a) a jack hitch device, which is configured to be connected to a hitch mount of a vehicle; and b) a jack hitch platform, which is configured to be detachably connected to the jack hitch device, wherein the jack hitch platform is configured to receive a cargo object for transportation, wherein the jack hitch platform further comprises:

a platform surface; and a right side pivotable panel, which is configured to pivot to a closed position in an upright orientation and pivot to a folded down configuration, with an outer end of the right side pivotable panel resting on an adjacent ground surface, such that the right side pivotable panel facilitates loading of the cargo object onto the platform surface;

wherein a right side of the platform surface is configured with a beveled cutoff, which is configured to align with a top surface of the right side pivotable panel, when the right side pivotable panel is positioned in the folded down configuration, such that an alignment of the top surface and the beveled cutoff facilitates the loading of the cargo object onto the platform surface.

28. A jack hitch system, comprising:

a) a jack hitch device, which is configured to be connected to a hitch mount of a vehicle; and b) a jack hitch platform, which is configured to be detachably connected to the jack hitch device, wherein the jack hitch platform is configured to receive a cargo object for transportation, wherein the jack hitch platform further comprises:

a platform surface;

wherein the platform surface further comprises:

a plurality of vertically oriented longitudinal plates;

wherein a front-most longitudinal plate further comprises left and right upward protruding front mounting points, each including a front mounting aperture; and wherein a rear-most oriented longitudinal plate further comprises left and right upward protruding rear mounting points, each including a rear mounting aperture; such that the left and right upward protruding front mounting points and the left and right upward protruding rear mounting points are configured to be used as tie-down mounting points for securing the cargo object on the platform surface.

29. A jack hitch system, comprising:

a) a jack hitch device, which is configured to be connected to a hitch mount of a vehicle; and b) a jack hitch platform, which is configured to be detachably connected to the jack hitch device, wherein the jack hitch platform is configured to receive a cargo object for transportation, wherein the jack hitch platform further comprises:

a platform surface; and wherein the platform surface further comprises:

a plurality of vertically oriented longitudinal plates;

a plurality of m-shaped mounting clips, each comprising:

a first downward-facing u-shaped portion; and a second downward-facing u-shaped portion;

wherein each corresponding m-shaped mounting clip is configured to clip on top of a first vertically oriented longitudinal plate and a second vertically oriented longitudinal plate, with first downward-facing u-shaped portion and the second downward-facing u-shaped portion sliding onto the first vertically oriented longitudinal plate and the second vertically oriented longitudinal plate, respectively;

such that the corresponding m-shaped mounting clip is configured to secure a corresponding pivotable wheel, with an upward protruding bolt of the corresponding pivotable wheel protruding through an aperture of the m-shaped mounting clip.

* * * * *